(12) United States Patent
Lin

(10) Patent No.: US 11,877,689 B1
(45) Date of Patent: Jan. 23, 2024

(54) MAGNETIC TEA-BREWING DEVICE

(71) Applicant: Yisheng Lin, Guangdong (CN)

(72) Inventor: Yisheng Lin, Guangdong (CN)

( * ) Notice: Subject to any disclaimer, the term of this patent is extended or adjusted under 35 U.S.C. 154(b) by 0 days.

(21) Appl. No.: 18/380,779

(22) Filed: Oct. 17, 2023

Related U.S. Application Data

(63) Continuation of application No. PCT/CN2022/000110, filed on Jul. 28, 2022.

(30) Foreign Application Priority Data

Aug. 31, 2021 (CN) .......................... 202111016299.6

(51) Int. Cl.
*A47J 31/20* (2006.01)
*A47G 19/16* (2006.01)
*A47G 19/22* (2006.01)

(52) U.S. Cl.
CPC .............. *A47J 31/20* (2013.01); *A47G 19/16* (2013.01); *A47G 19/2211* (2013.01)

(58) Field of Classification Search
None
See application file for complete search history.

(56) References Cited

U.S. PATENT DOCUMENTS

2021/0113011 A1* 4/2021 Kawanobe .......... A47J 31/4407

FOREIGN PATENT DOCUMENTS

| CN | 204698258 U | 10/2015 |
| CN | 106108548 A * | 11/2016 |
| CN | 209219817 U | 8/2019 |
| CN | 209574244 U | 11/2019 |
| CN | 210249410 U | 4/2020 |
| CN | 210643564 U | 6/2020 |
| CN | 212015230 U | 11/2020 |
| CN | 212415389 U | 1/2021 |
| CN | 212815692 U | 3/2021 |
| CN | 213696461 U | 7/2021 |
| CN | 113598582 A | 11/2021 |

(Continued)

OTHER PUBLICATIONS

CN 106108548 A (Wang, Guang-Ying) Nov. 16, 2016 [retrieved on Nov. 30, 2023]. Retrieved from Foreign Image and Text database, translation by Clarivate Analytics. (Year: 2016).*

(Continued)

*Primary Examiner* — John J Norton
(74) *Attorney, Agent, or Firm* — COOPER LEGAL GROUP, LLC

(57) ABSTRACT

A magnetic device includes a cup body, a tea strainer and a cup lid, the cup lid is provided with a separation mechanism for tea strainer including a stressed block and a separation magnet, which is mounted on the stressed block, the stressed block under stress changes the relative position between the separation magnet and the cup lid, the tea strainer is provided with a magnetically attractive metal block and is attracted to the center of the bottom of the cup lid by attraction force between the separation magnet and the magnetically attractive metal block, the separation magnet moves away from the magnetically attractive metal block, such that the attraction force between them is decreased, when it is less than the gravity of the tea strainer, the tea strainer falls down to the bottom of the cup body under gravity.

12 Claims, 38 Drawing Sheets

(56) References Cited

FOREIGN PATENT DOCUMENTS

KR     2012004537 U  *  6/2012

OTHER PUBLICATIONS

KR 20120004537 U (Chen, Yi-Huang) Jun. 25, 2012 [retrieved on Nov. 30, 2023]. Retrieved from Foreign Image and Text database, translation by Clarivate Analytics. (Year: 2012).*
International Search Report of corresponding PCT application No. PCT/CN2022/000110; 5 Pgs.; dated Oct. 31, 2022.

* cited by examiner

MAGNETIC TEA-BREWING DEVICE

CROSS-REFERENCE TO RELATED APPLICATIONS

The present application claims the priority benefit of PCT application No. PCT/CN2022/000110, filed on Jul. 28, 2022, which claims priority and benefit of Chinese patent application serial no. 202111016299.6, filed on Aug. 31, 2021. The entireties of PCT application No. PCT/CN2022/000110 and Chinese patent application serial no. 202111016299.6 are incorporated herein by reference and made a part of this specification.

TECHNICAL FIELD

The present application relates to the technical field of brewing tea, and in particular to a magnetic tea-brewing device.

BACKGROUND

As the society continuously develops, more and more people like to brew tea. Brewing tea is beneficial to keep in good health. However, different people have different preferences for tea concentration, and the existing cup cannot make an adjustment for tea concentration.

A Chinese invention patent, with publication Number CN204698258U, discloses a new multifunctional tea-brewing cup, including a cup body and an upper lid, wherein a movable tea box is placed in the cup body, and the upper lid includes a cylindrical lid body, in which an intermediate spacer base is provided. A magnetic attraction mechanism is provided between the intermediate spacer base and the tea box, and the intermediate spacer base is mounted with a tea box push mechanism. After the tea box with tea leaves is placed in the cup body, water is poured into the cup body, and the upper lid is connected to the cup body. When the cup body returns to the upright position after an inversion, the tea box is attracted to the bottom of the intermediate spacer base by the magnetic attraction mechanism so as to get out of the water. When it is necessary to brew tea, the tea box push mechanism is pressed to push the tea box, such that the tea box falls into the water in the cup body. In this invention, the magnetic attraction mechanism and the push mechanism are both provided at the upper lid, which causes a complex structure. Furthermore, this structure is related to a sealing problem of the push rod. Although an elastic sealing cap is adopted, the process difficulty and production cost is hereby increased, which restricts the market promotion.

SUMMARY

The purpose of the present application is to provide a magnetic tea-brewing device with simple structure, which is convenient to use and can adjust the tea concentration. The magnetic tea-brewing device can be used in teacups and other tea-brewing device, which solves the problem that an attracted state of the tea strainer cannot be achieved in other magnetic cup lid.

To solve the above technical problem, the following technical solution is disclosed.

A magnetic tea-brewing device includes a cup body, a tea strainer, and a cup lid connected to the cup body, wherein the tea strainer is placed inside the cup body when in use, the cup lid is provided with a separation mechanism for tea strainer, the separation mechanism for tea strainer includes a stressed block and a separation magnet, the separation magnet is mounted on the stressed block, the stressed block under stress changes a relative position between the separation magnet and the cup lid, the tea strainer is provided with a magnetically attractive metal block, the magnetically attractive metal block of the tea strainer is configured to be attracted by the separation magnet, the stressed block is stressed when brewing tea, such that the separation magnet moves away from the magnetically attractive metal block, an attraction force to the magnetically attractive metal block from the separation magnet is decreased, thus the tea strainer falls down to the bottom of the cup body due to gravity when the attraction force is less than a gravity of the tea strainer, and it is started to brew tea; the cup body is turned over when it is necessary to stop brewing tea, such that the tea strainer is close to the cup lid due to gravity, the stressed block makes the separation magnet move to the cup lid due to gravity, and the tea strainer is attracted to the cup lid because the magnetically attractive metal block attracts the separation magnet.

Optionally, the stressed block has a regular geometry with uneven mass distribution, a first end of the stressed block with the separation magnet is lighter than a second end of the stressed block without the separation magnet, such that under gravity, the second end of the stressed block without the separation magnet is below, and the first end of the stressed block with the separation magnet is above, when an external force is applied to the stressed block, the relative position between the separation magnet and the cup lid is changed.

Optionally, the cup lid is provided with a support pillar, the stressed block includes a rotary shaft and a counter weight, the rotary shaft is rotatably mounted on the support pillar, the separation magnet is mounted on a first end of the rotary shaft, the counter weight is mounted on a second end of the rotary shaft, and the counter weight is heavier than the separation magnet.

Optionally, the stressed block includes a rotary knob shell and a counter weight, the separation magnet and the counter weight are respectively arranged on an upper end and a lower end of the rotary knob shell, the counter weight is heavier than the separation magnet, so that a center of gravity of the rotary knob shell as a whole is biased to the end of the rotary knob shell with the counter weight, the cup lid is configured with a cavity for accommodating the rotary knob shell, and the rotary knob shell is rotatably mounted in the cavity.

Optionally, the rotary knob shell includes an upper rotary knob shell and a lower rotary knob shell, an edge of the upper rotary knob shell is provided with an arc-shaped connection part, the upper rotary knob shell is provided with a snap part, an edge of the lower rotary knob shell is provided with a cut, the lower rotary knob shell is provided with a buckle, the arc-shaped connection part cooperates with the cut, and the buckle is in snap-connection with the snap part.

Optionally, the cup lid includes an upper lid and a lower lid, the lower lid is configured with a water outlet, the upper lid is assembled with a flap cover, the flap cover is provided with a snap protrusion for flap cover, the lower lid is provided with a snap part for flap cover, the flap cover is in snap-connection with the snap part for flap cover through the flap protrusion for flap cover, and a bottom of the flap cover is provided with a sealing plug configured to seal the water outlet.

Optionally, the flap cover is provided with an elastic strip of flap cover.

Optionally, the tea strainer includes a tea strainer cap and a strainer body, the tea strainer cap covers the strainer body, an accommodating space configured to accommodate tea leaves is formed between the tea strainer cap and the strainer body after the tea strainer cap covers the strainer body, the tea strainer cap is provided with a magnetic attraction device, the magnetic attraction device is provided with a magnetically attractive metal block, and after the tea strainer cap covers the strainer body, a center of gravity of the tea strainer is biased to the tea strainer cap.

Optionally, the tea strainer cap is heavier than the strainer body.

Optionally, the magnetic attraction device is detachably mounted on a top of the tea strainer cap, and the top of the tea strainer cap is configured with an annular positioning groove configured to be snap-fitted with the cup lid.

Optionally, the magnetic attraction device is configured with a first accommodating chamber and a second accommodating chamber, the first accommodating chamber is configured to accommodate the magnetically attractive metal block, and a counter weight is accommodated in the second accommodating chamber.

Optionally, the magnetic attraction device includes an upper magnetic snap and a lower magnetic snap, a top of the tea strainer cap is configured with an assembling through hole configured for the upper magnetic snap to pass through, the upper magnetic snap passes through the assembling through hole, to be in snap-connection with the lower magnetic snap for fixing on the top of the tea strainer cap.

Beneficial Technical Effects

The principle that the magnet attracts magnetically attractive metal or iron block is adopted. By providing the separation mechanism for tea strainer on the cup lid, the cup lid can attract or release the tea strainer. When brewing tea, an external force is applied to the stressed block, so as to make the separation magnet move away from the magnetically attractive metal block. The attraction force to the magnetically attractive metal block from the separation magnet is decreased, and when it is lower than the gravity of the tea strainer, the tea strainer falls down to the bottom of the cup body under gravity, it is started to brew tea. When it is necessary to stop brewing tea, the cup body is turned over, the tea strainer is close to the cup lid due to gravity, the separation magnet attracts the magnetically attractive metal, such that the tea strainer is attracted to the cup lid, and the tea strainer is separated from the tea water after the cup body returns to the upright position, thereby achieving the adjustment of tea concentration. The present application has a simple structure, is convenient to use and able to adjust the tea concentration, which solves the problem that tea concentration cannot be adjusted in the existing technology.

DESCRIPTION OF THE EMBODIMENTS

Figure 1:
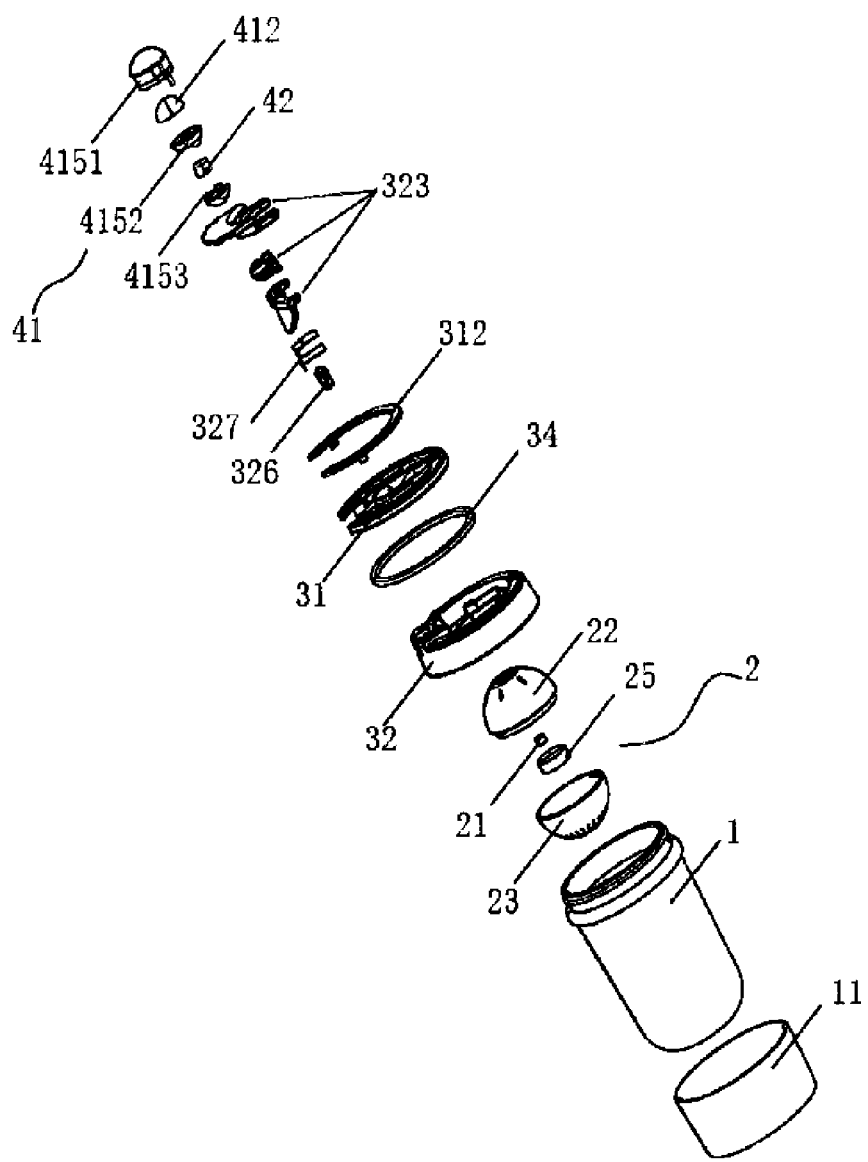
FIG. 1 is an exploded diagram showing the overall structure of the push button of the magnetic tea-brewing device in an embodiment of the present application.
Figure 2:
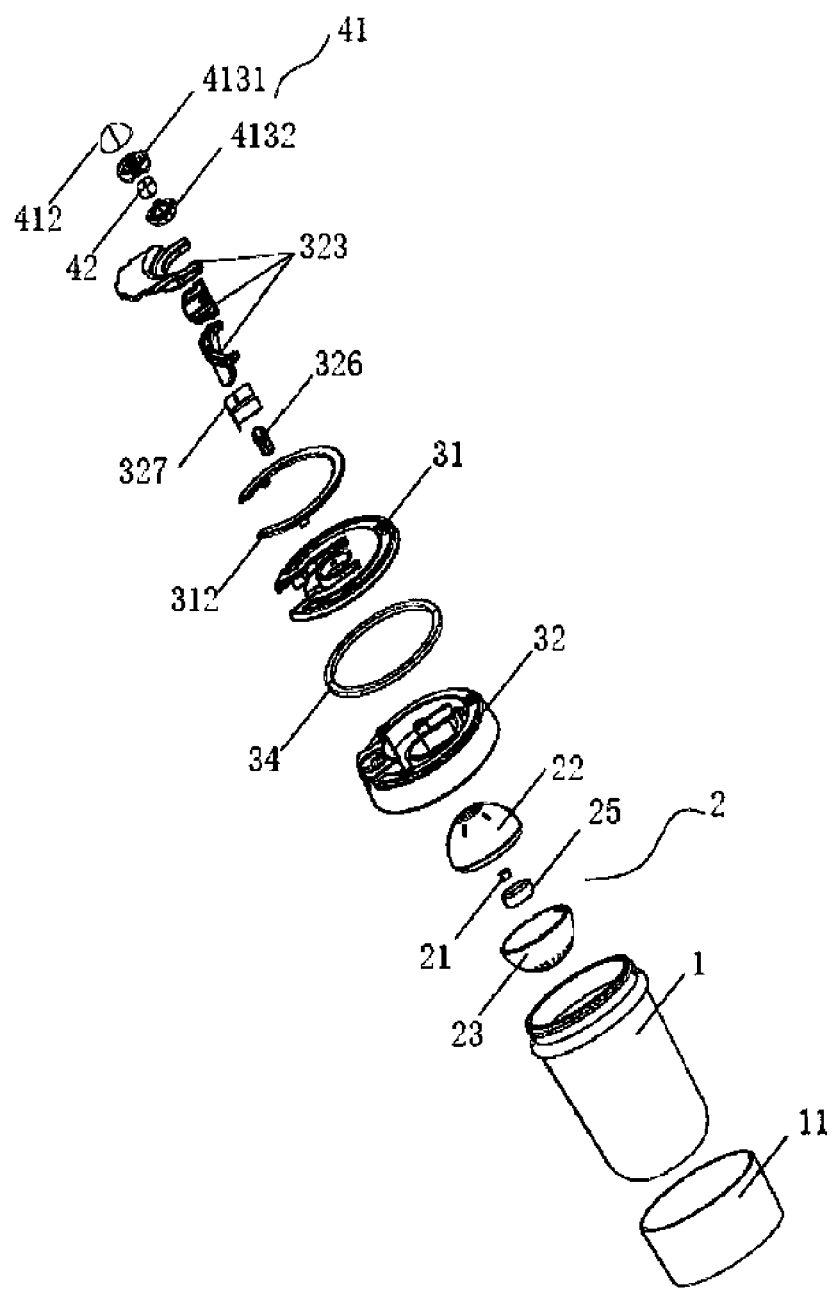
FIG. 2 is an exploded diagram showing the overall structure of the rotary knob of the magnetic tea-brewing device in an embodiment of the present application.
Figure 3:
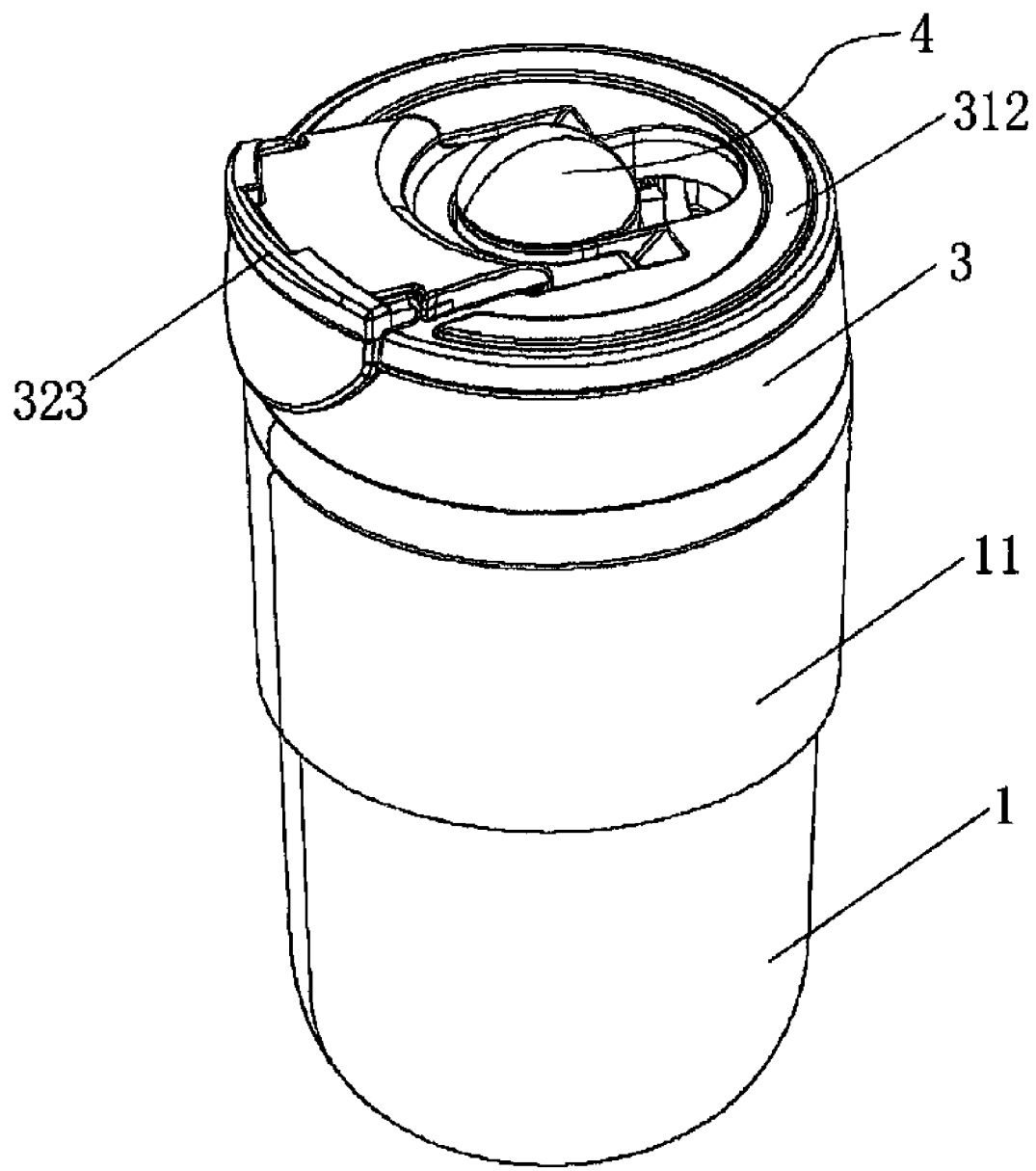
FIG. 3 is a diagram showing the overall structure of the push button of the magnetic tea-brewing device in an embodiment of the present application.
Figure 4:
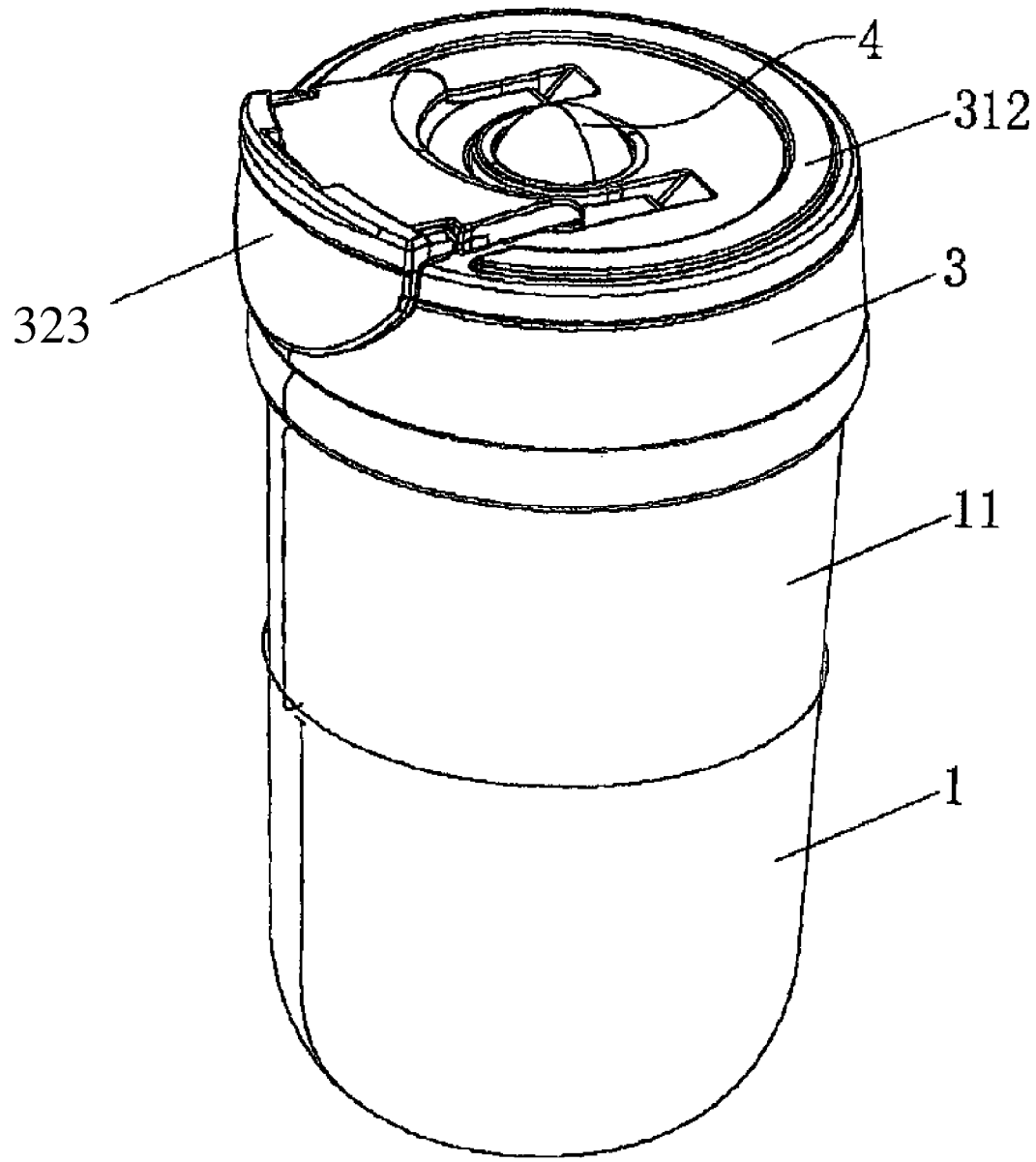
FIG. 4 is a diagram showing the overall structure of the rotary knob of the magnetic tea-brewing device in an embodiment of the present application.

The present application will be further described in detail in combination with the drawings and specific embodiments. The illustrative embodiment and description described herein is only used to explain the present application, and does not tend to limit the present application.

Embodiment 1

Referring to FIGS. 1-4, a magnetic device includes a cup body 1, a tea strainer 2, and a cup lid 3 that is in sealing connection with the cup body 1. The tea strainer 2 is placed inside the cup body 1 when in use. The cup lid 3 includes an upper lid 31 and a lower lid 32, wherein the upper lid 31 fixedly covers the lower lid 32. Specially, a separation mechanism for tea strainer 4 is provided on the cup lid 3, wherein the separation mechanism for tea strainer 4 includes a stressed block 41 and a separation magnet 42, the separation magnet 42 is mounted on the stressed block 41, and the stressed block 41 under stress changes the relative position between the separation magnet 42 and the cup lid 3. The internal center of the tea strainer 2 is provided with a sealed magnetically attractive metal block 21, the tea strainer 2 is so attracted to the center of the bottom of the cup lid 3, that the separation magnet 42 attracts the magnetically attractive metal block 21. When brewing tea, the stressed block 41 is stressed so as to detach the separation magnet 42 from the magnetically attractive metal block 21, such that the attraction force to the magnetically attractive metal block 21 from the separation magnet 42 is decreased, when it is lower than the gravity of the tea strainer 2, the tea strainer 2 falls down to the bottom of the cup body 1 due to gravity, and the tea is started to be brewed. When it is necessary to stop brewing tea, the cup body 1 can be turned over, such that the tea strainer 2 moves to the cup lid 3 under gravity, and the stressed block 41 makes the separation magnet 42 faces the cup lid 3 due to gravity and the separation magnet 42 is close to the magnetically attraction metal block 21. Thus, the tea strainer 2 is so attracted to the bottom of the cup lid 3, that the separation magnet 42 attracts the magnetically attractive metal block 21, thereby separating the tea strainer 2 from the water.

Specially, in the technical solution of the present embodiment, the stressed block 41 has a regular geometry with uneven mass distribution, the first end of the stressed block 41 with the separation magnet 42 is lighter than the second end of the stressed block 41 without the separation magnet 42. The second end of the stressed block 41 without the separation magnet 42 tends to move downward under gravity, while the first end of the stressed block 41 with the separation magnet 42 tends to move upward. When the stressed block 41 is stressed, the stressed block 41 moves to change the relative position between the separation magnet 42 and the cup lid 3.

Figure 5:
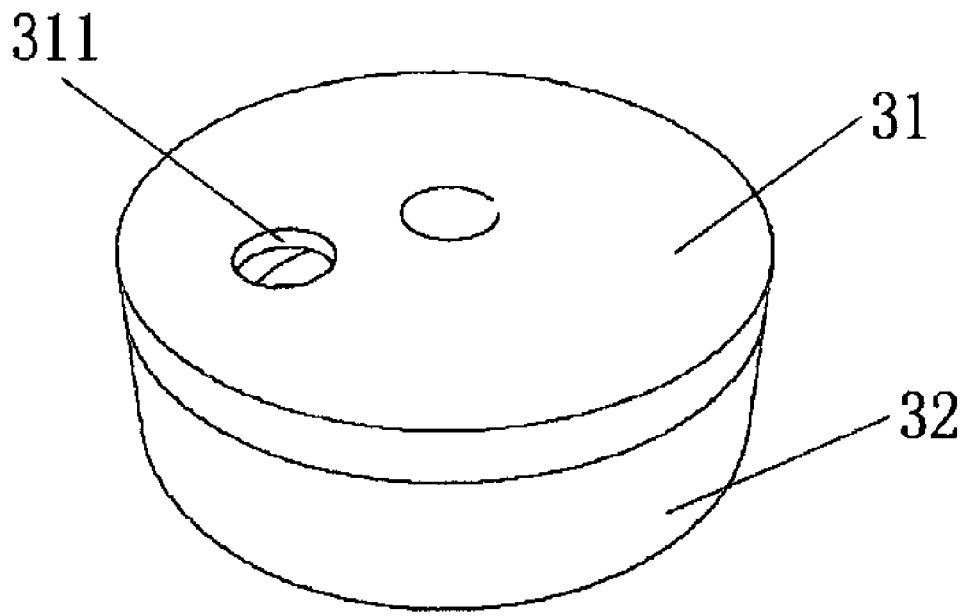
FIG. 5 is a diagram showing the assembled separation mechanism for the cup lid and the tea strainer in an embodiment of the present application.
Figure 6:
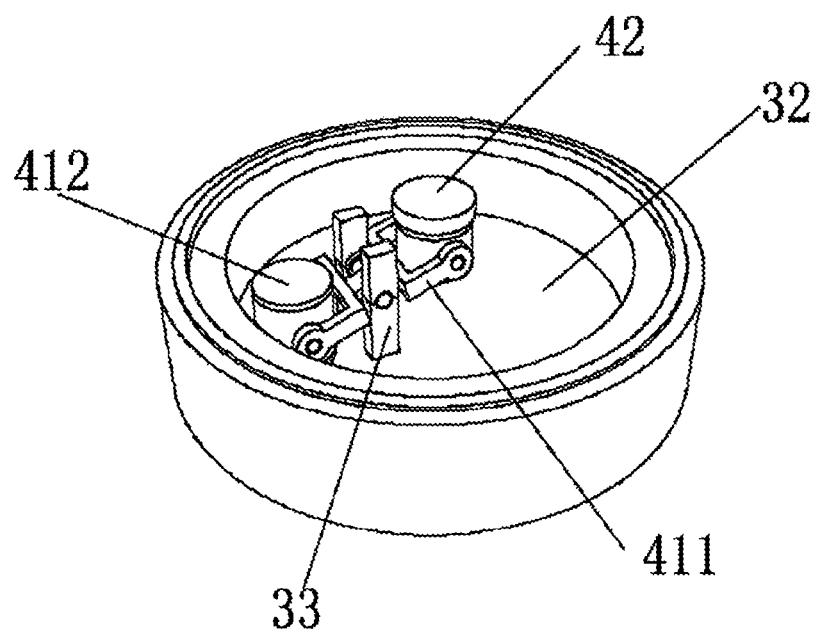
FIG. 6 is a diagram showing the internal structure of the cup lid in an embodiment of the present application.
Figure 7:
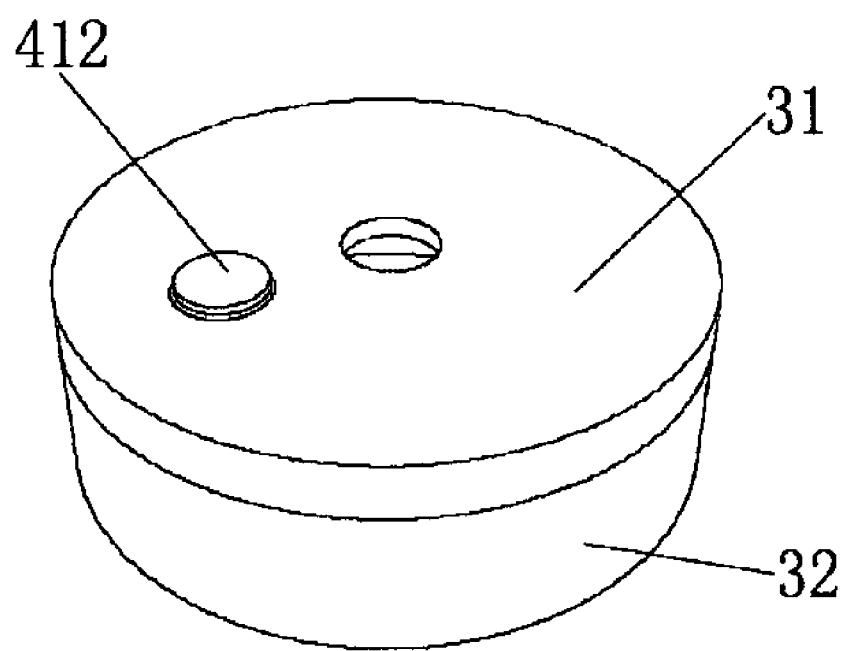
FIG. 7 is a diagram showing the assembled separation mechanism for cup lid and tea strainer in an embodiment of the present application.
Figure 8:
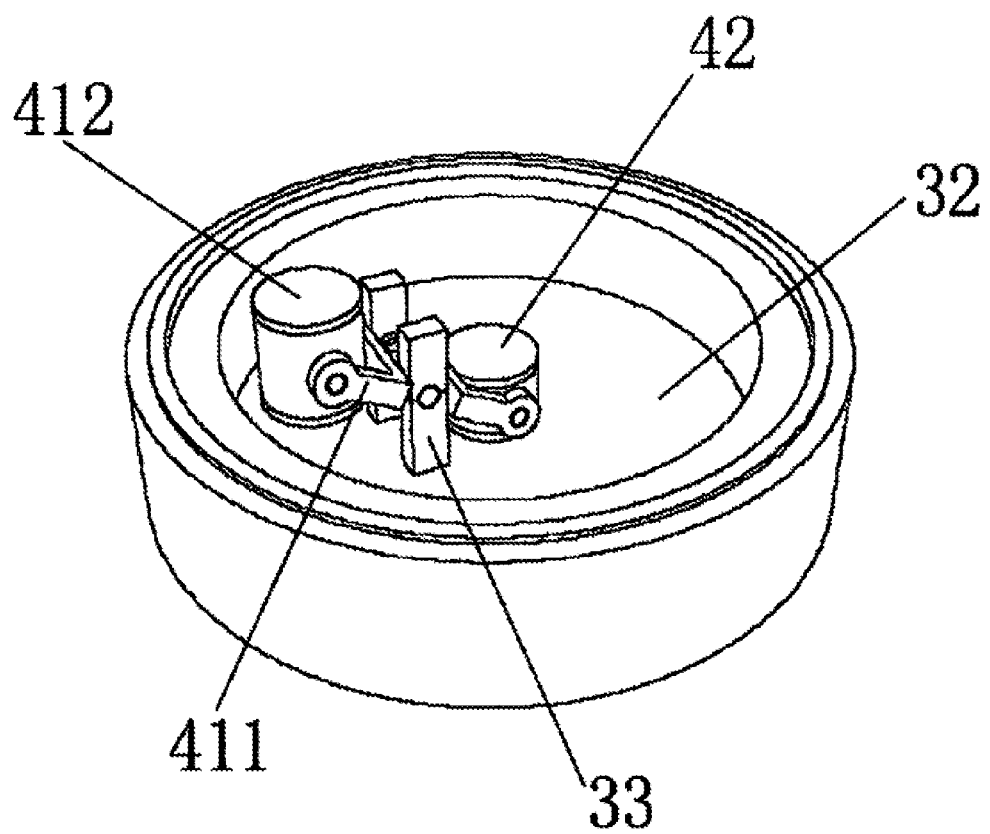
FIG. 8 is a diagram showing the internal structure of the cup lid in an embodiment of the present application.
Figure 9:
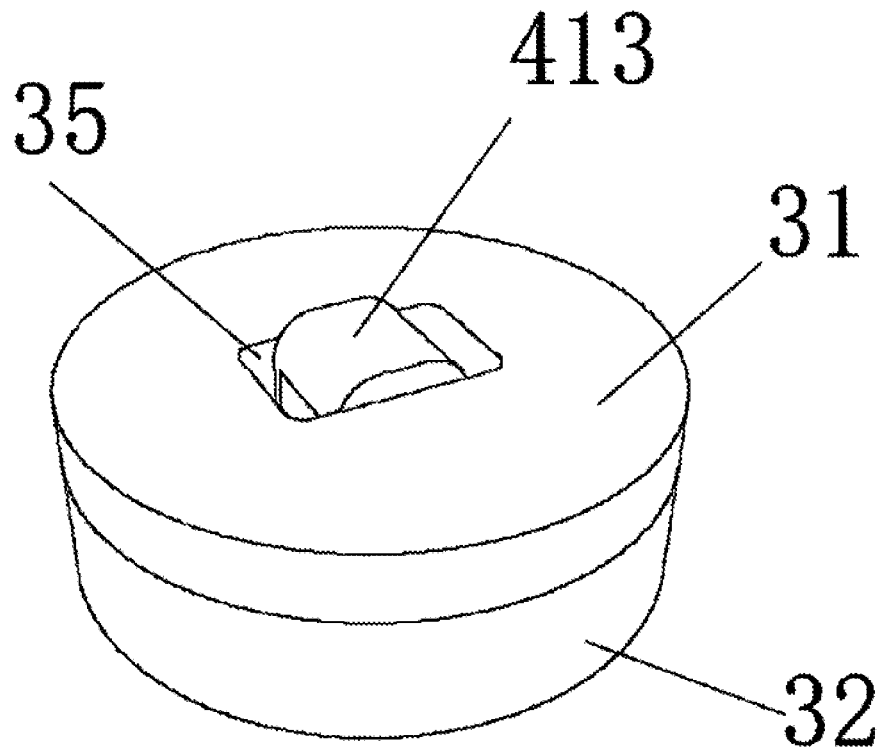
FIG. 9 is a diagram showing the assembled cup lid and rotary knob shell in an embodiment of the present application.
Figure 10:
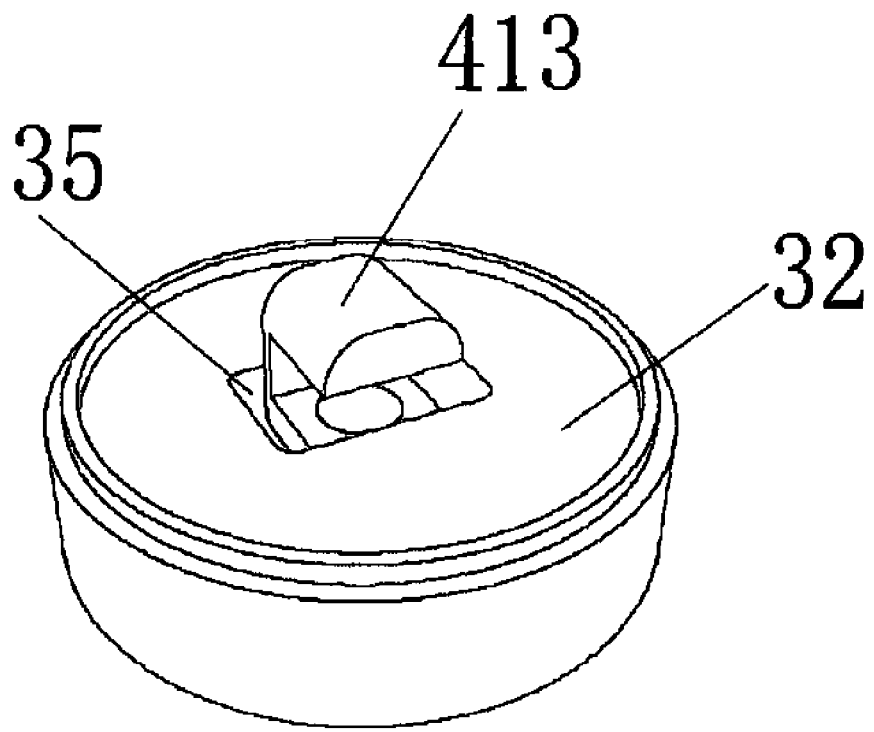
FIG. 10 is a diagram showing the assembled lower lid and rotary knob shell in an embodiment of the present application.
Figure 11:
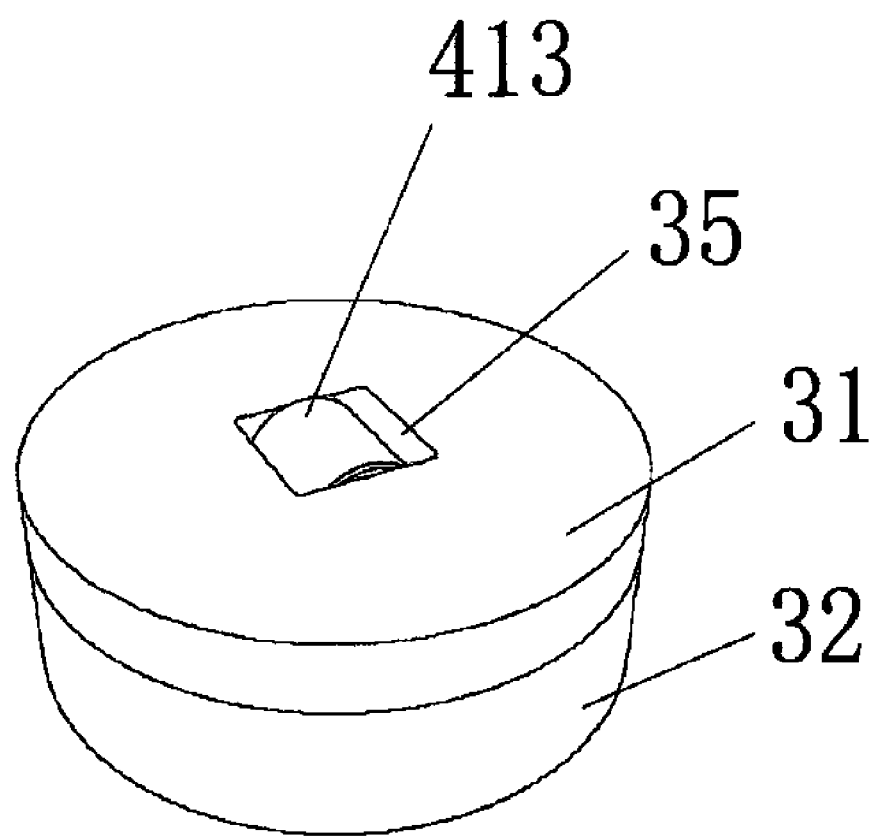
FIG. 11 is a diagram showing the assembled cup lid and rotary knob shell in an embodiment of the present application.
Figure 12:
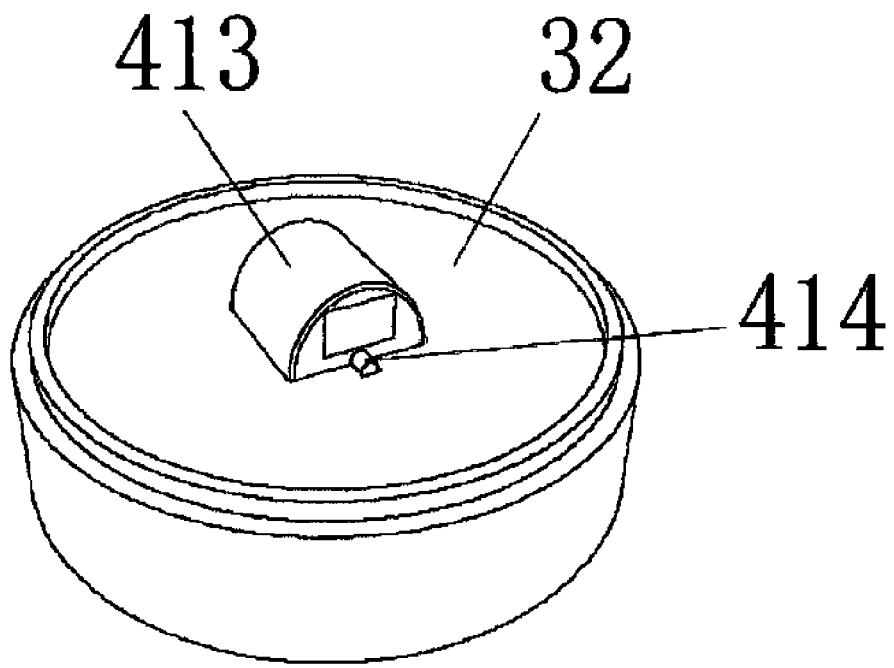
FIG. 12 is a diagram showing the assembled lower lid and rotary knob shell in an embodiment of the present application.
Figure 13:
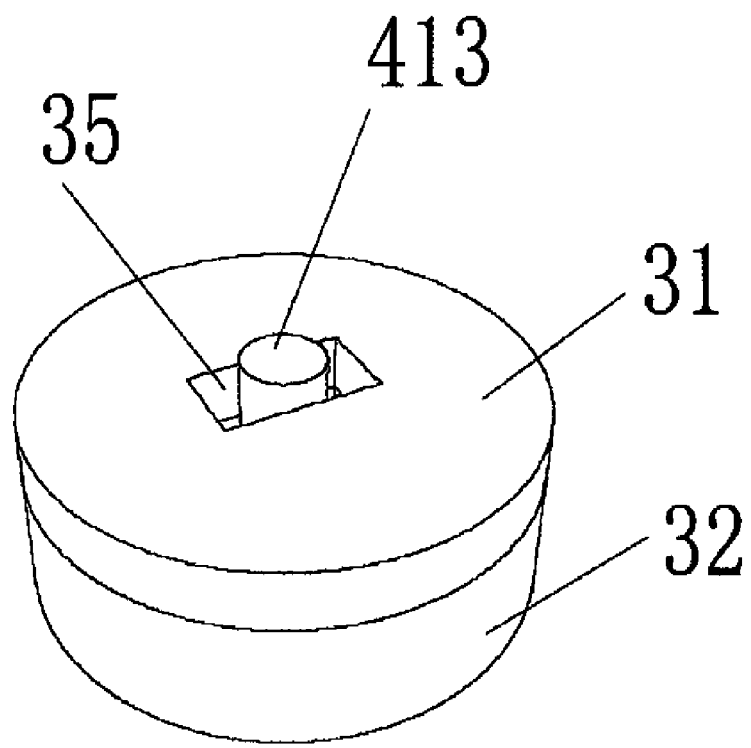
FIG. 13 is a diagram showing the assembled cup lid and rotary knob shell in an embodiment of the present application.
Figure 14:
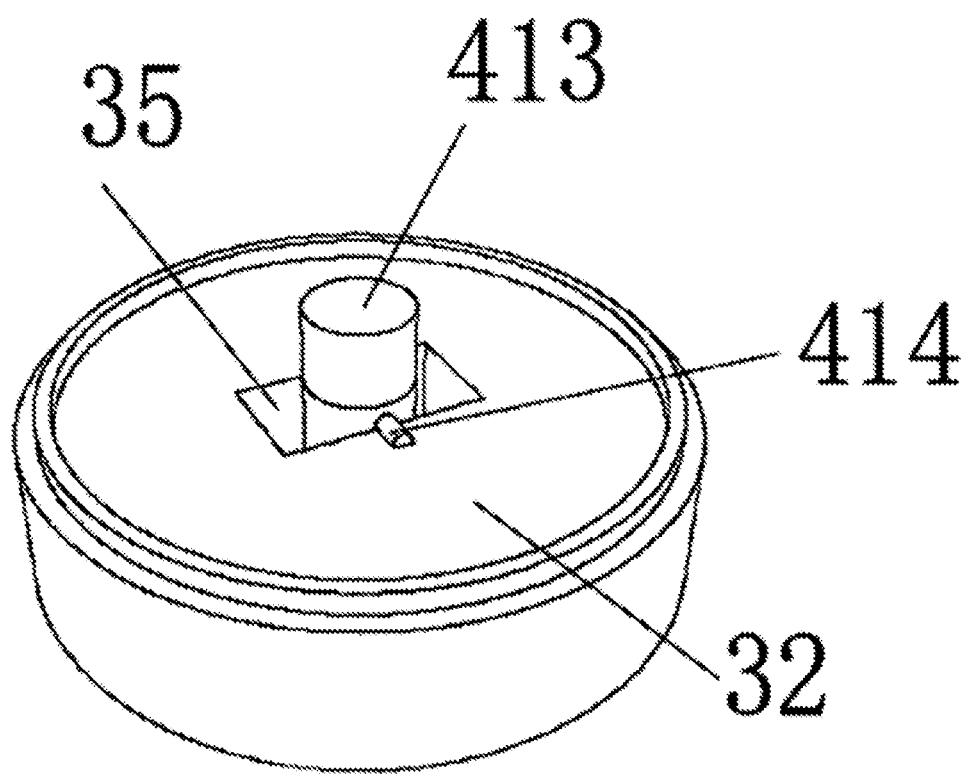
FIG. 14 is a diagram showing the assembled lower lid and rotary knob shell in an embodiment of the present application.
Figure 15:
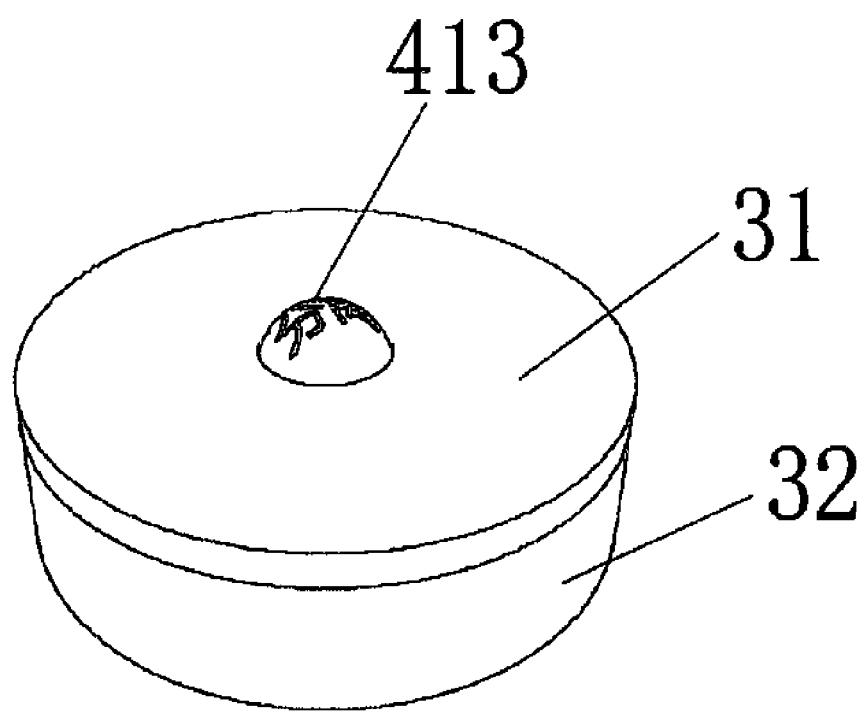
FIG. 15 is a diagram showing the assembled cup lid and rotary knob shell in an embodiment of the present application.
Figure 16:
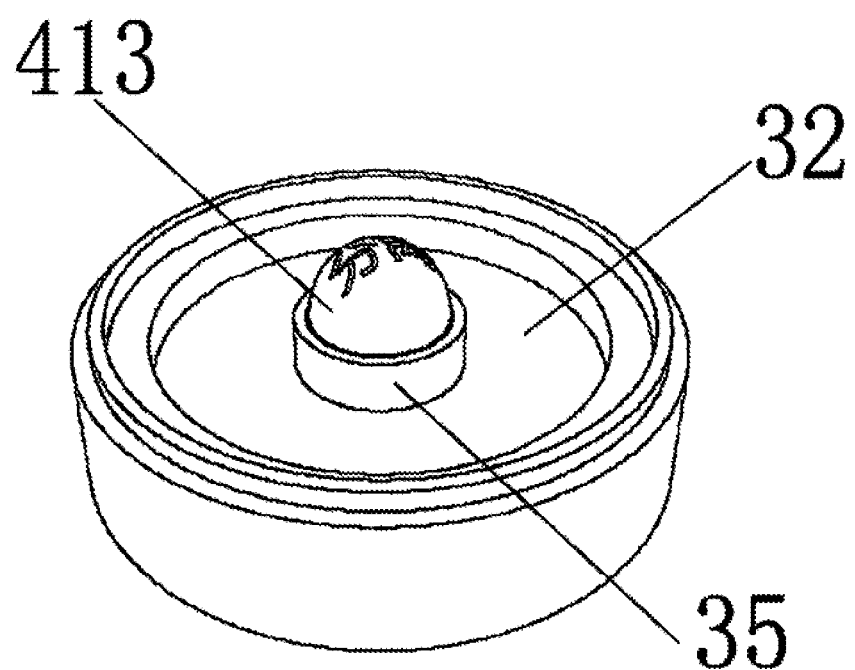
FIG. 16 is a diagram showing the assembled lower lid and rotary knob shell in an embodiment of the present application.

Referring to FIG. 5 and FIG. 8, in the technical solution of the present embodiment, the stressed block 41 has a level structure. A support pillar 33 is provided between the upper lid 31 and the lower lid 32. The stressed block 41 includes a rotary shaft 411 and a counter weight 412, wherein the rotary shaft 411 is rotatably mounted on the support pillar 33, the separation magnet 42 is mounted on a first end of the rotary shaft 411, while the counter weight 412 is mounted on a second end of the rotary shaft 411, and the counter weight 412 is heavier than the separation magnet 42. The upper lid 31 is configured with a through hole 311 for counter weight 412 to pass through. It should be understood, since the counter weight 412 is heavier than the separation magnet 42, the rotary shaft 411 acts as a balance structure and the counter weight 412 is always lower than the separation magnet 42. When the cup lid 3 and the cup body 1 is in an inverted state, under gravity, the second end of the rotary shaft 411 with the counter weight 412 is below, while the first end of the rotary shaft 411 with the separation magnet 42 is above, so that the tea strainer 2 is close to the bottom of the cup lid 3 and is attracted by the separation magnet 42. After the cup body 1 is returned to the upright position, the tea strainer 2 remains in the attracted state, such that the tea strainer 2 is separated from the tea water. When it is necessary to brew tea again, the counter weight 412 can be pressed, the separation magnet 42 rises while the separation magnet 42 gradually moves away from the bottom of the cup lid 3 by means of the rotary shaft 411, so that the attraction force to the magnetically attractive metal block 21 from the separation magnet 42 is decreased. Thus the tea strainer 2 falls down to the bottom of the cup body 1 under gravity when the attraction force is less than the gravity of the tea strainer 2, and it is started to brew tea. It should be understood that the counter weight 412 can be packaged in a sealing manner by encapsulation.

Figure 24:
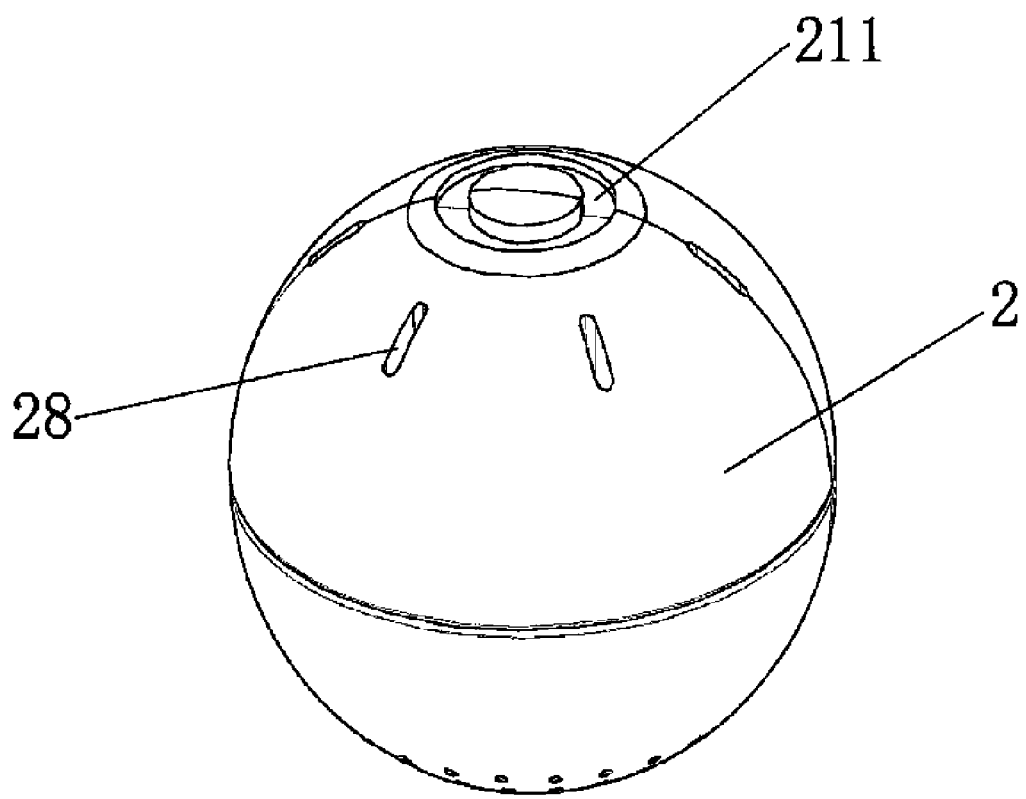
FIG. 24 is a diagram showing the overall structure of the tea strainer in an embodiment of the present application.
Figure 25:
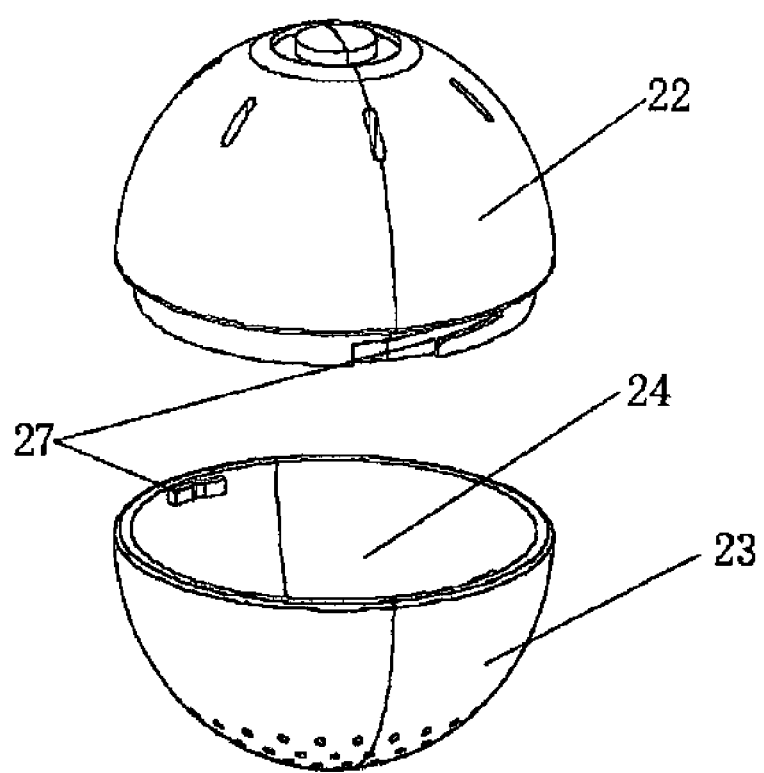
FIG. 25 is an exploded diagram showing the structure of the tea strainer in an embodiment of the present application.
Figure 26:
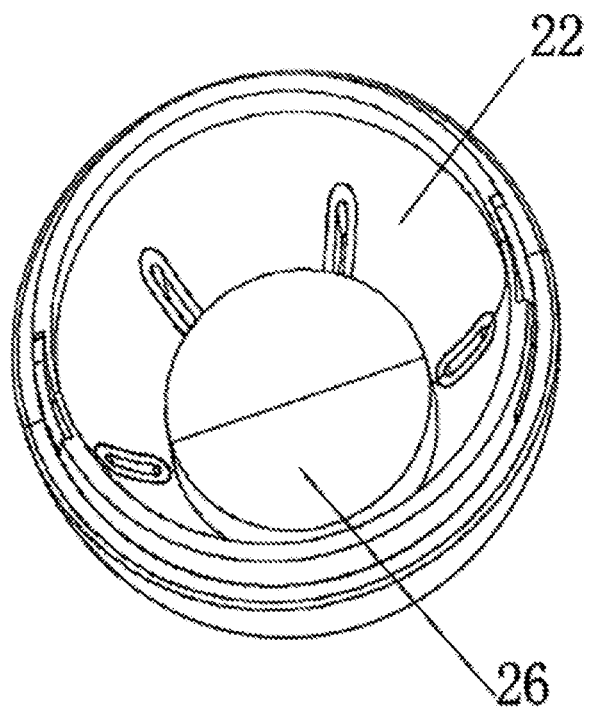
FIG. 26 is a diagram showing the structure of the upward tea strainer cap in an embodiment of the present application.
Figure 27:
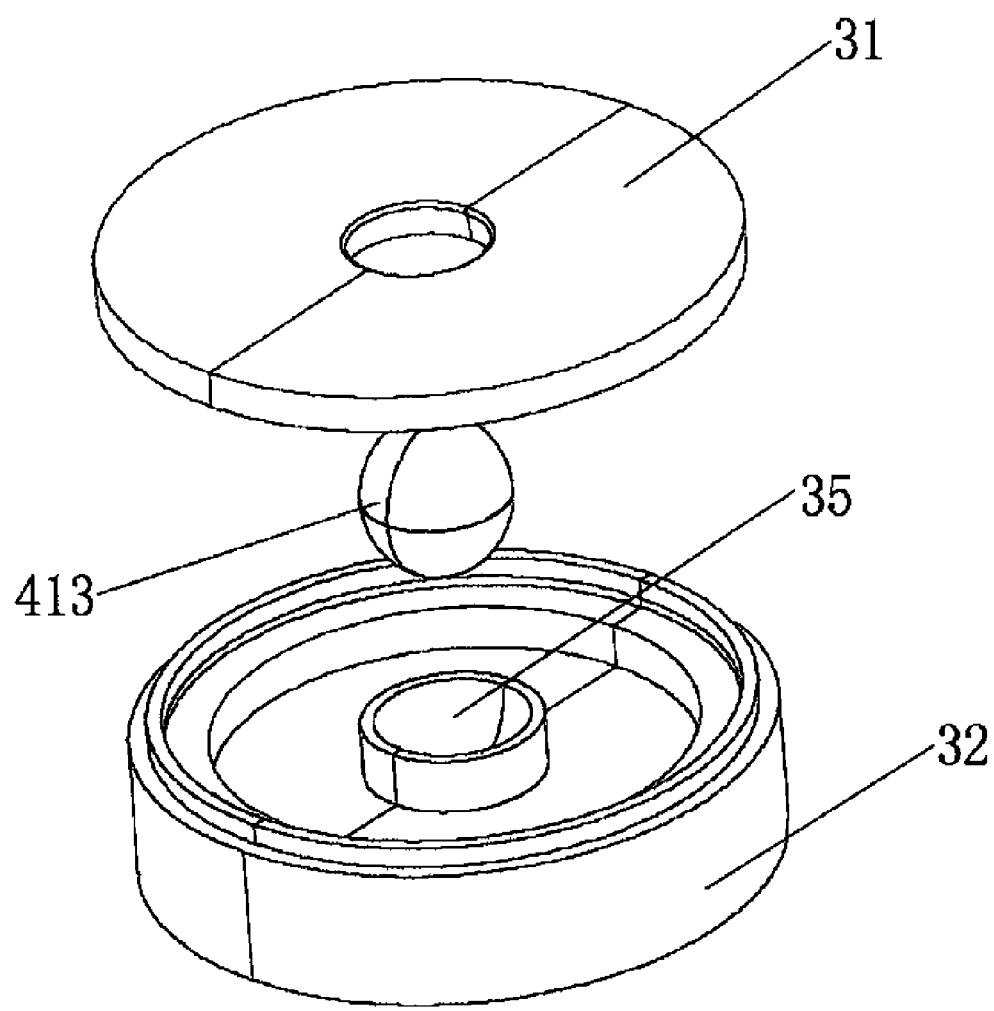
FIG. 27 is an overall exploded diagram of FIG. 15.
Figure 28:
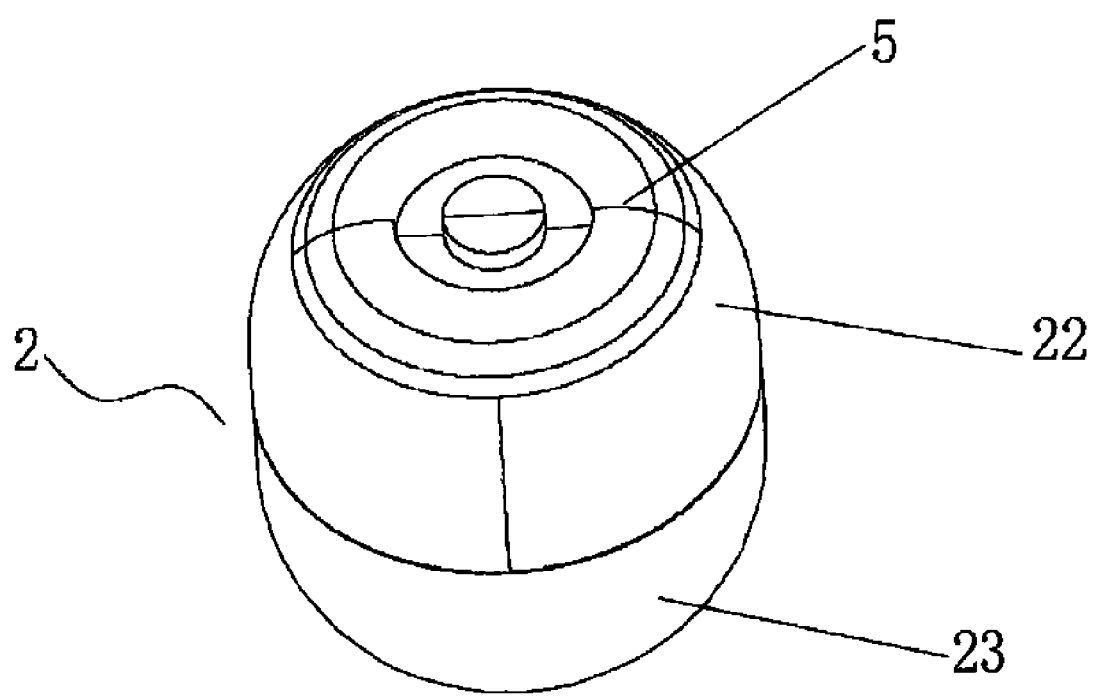
FIG. 28 is a perspective diagram showing the structure of the magnetic tea strainer in embodiment 6 of the present application.
Figure 29:
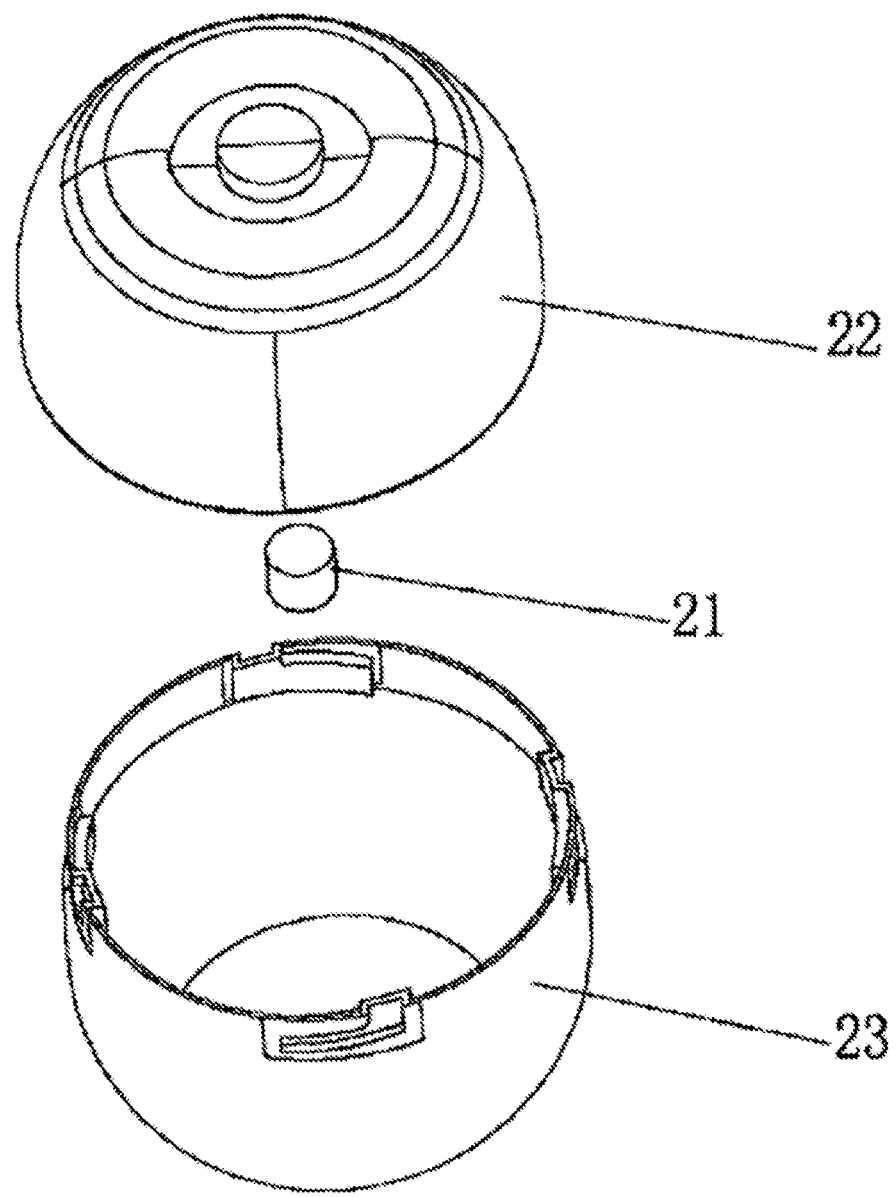
FIG. 29 is an exploded diagram showing the structure of the magnetic tea strainer in embodiment 6 of the present application.
Figure 30:
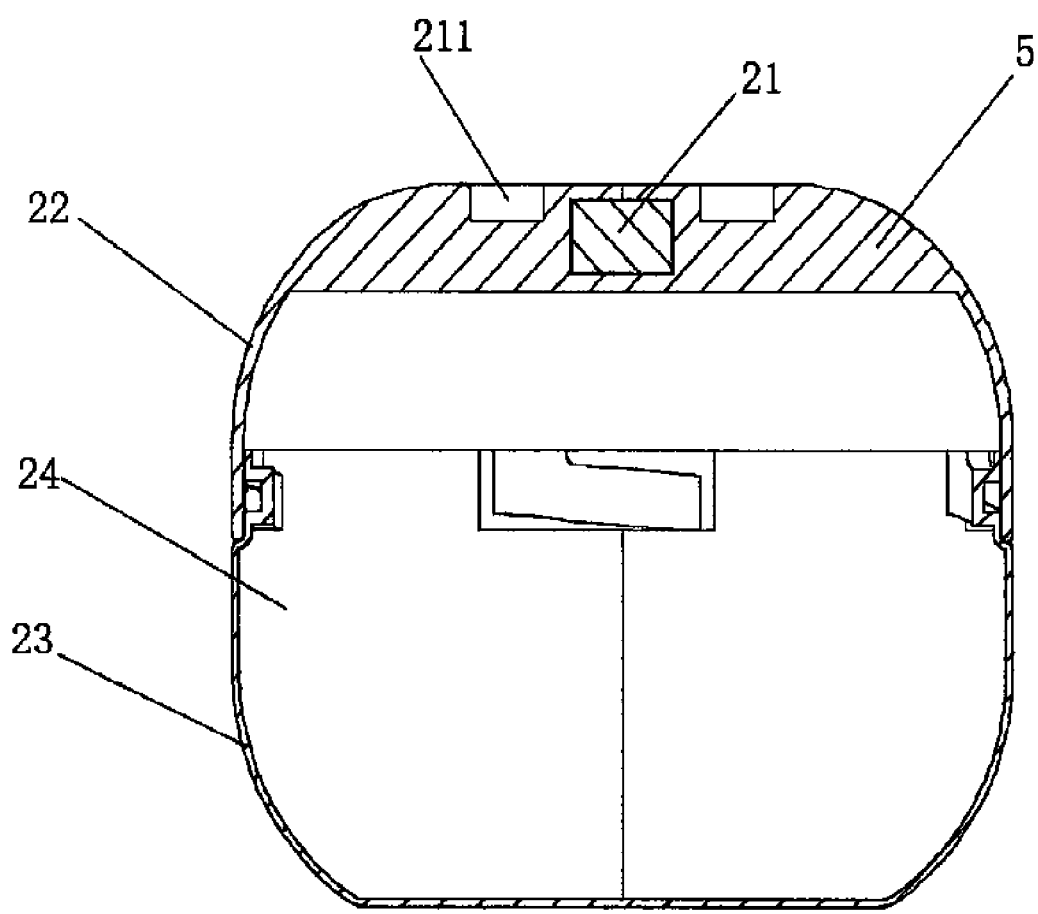
FIG. 30 is an axial section view of FIG. 28.
Figure 31:
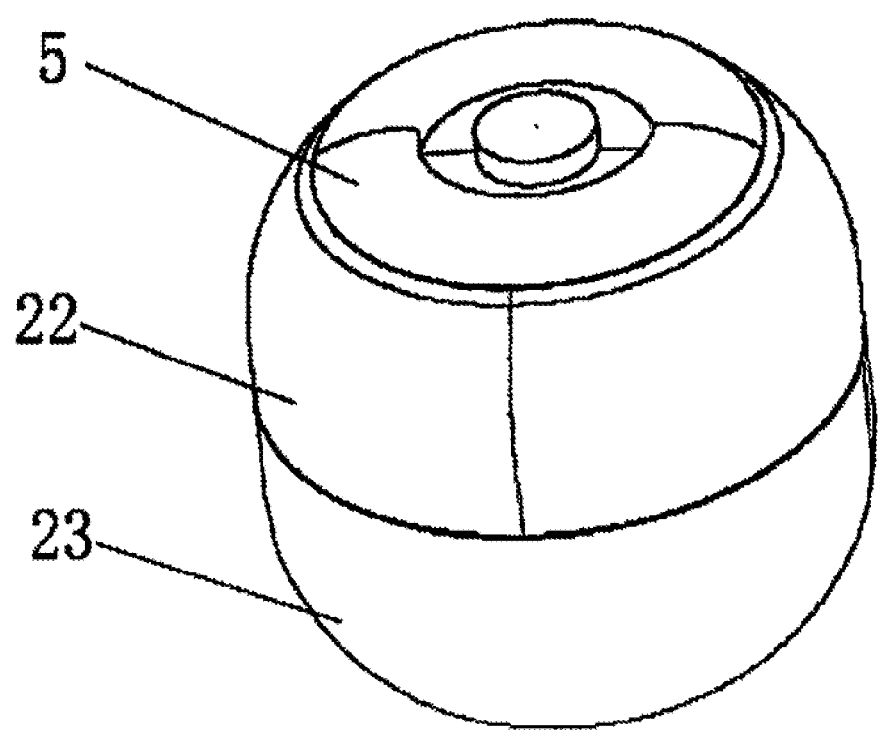
FIG. 31 is a perspective diagram showing the structure of the magnetic tea strainer in embodiment 7 of the present application.
Figure 32:
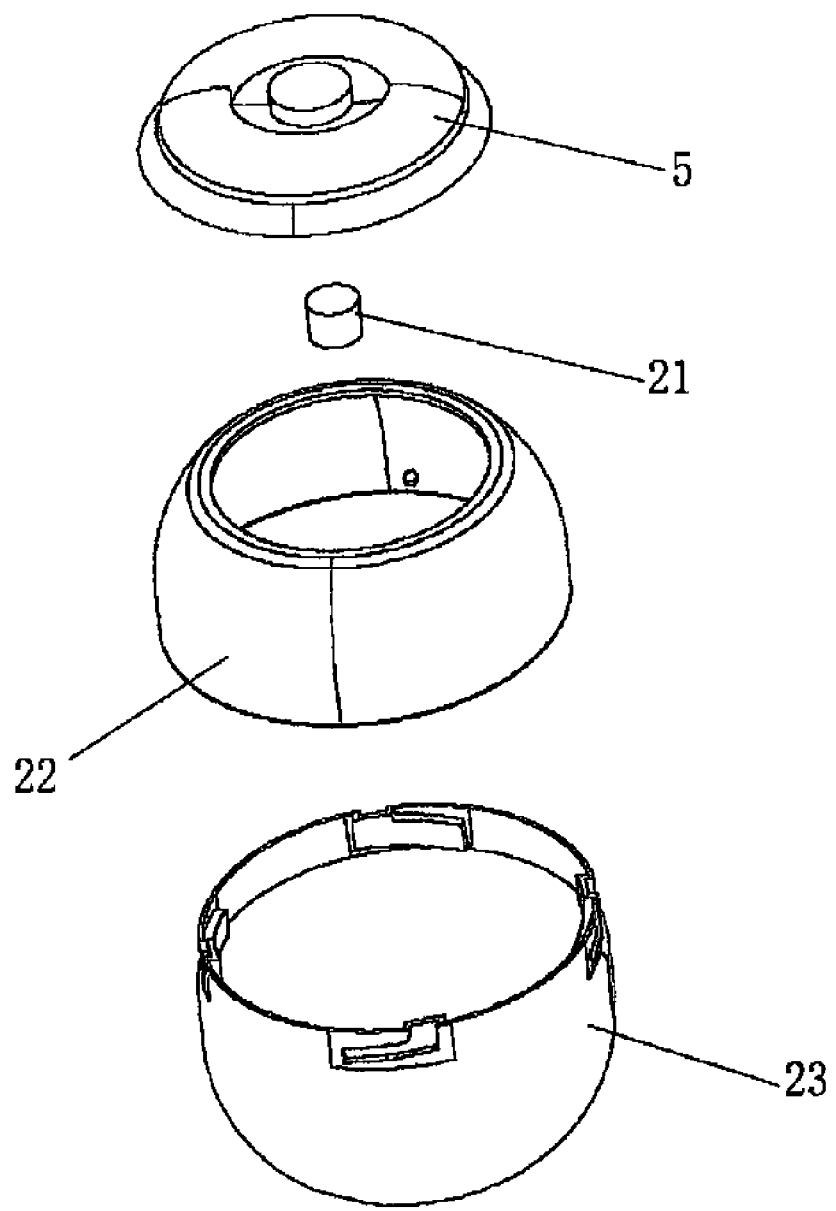
FIG. 32 is an exploded diagram showing the structure of the magnetic tea strainer in embodiment 7 of the present application.
Figure 33:
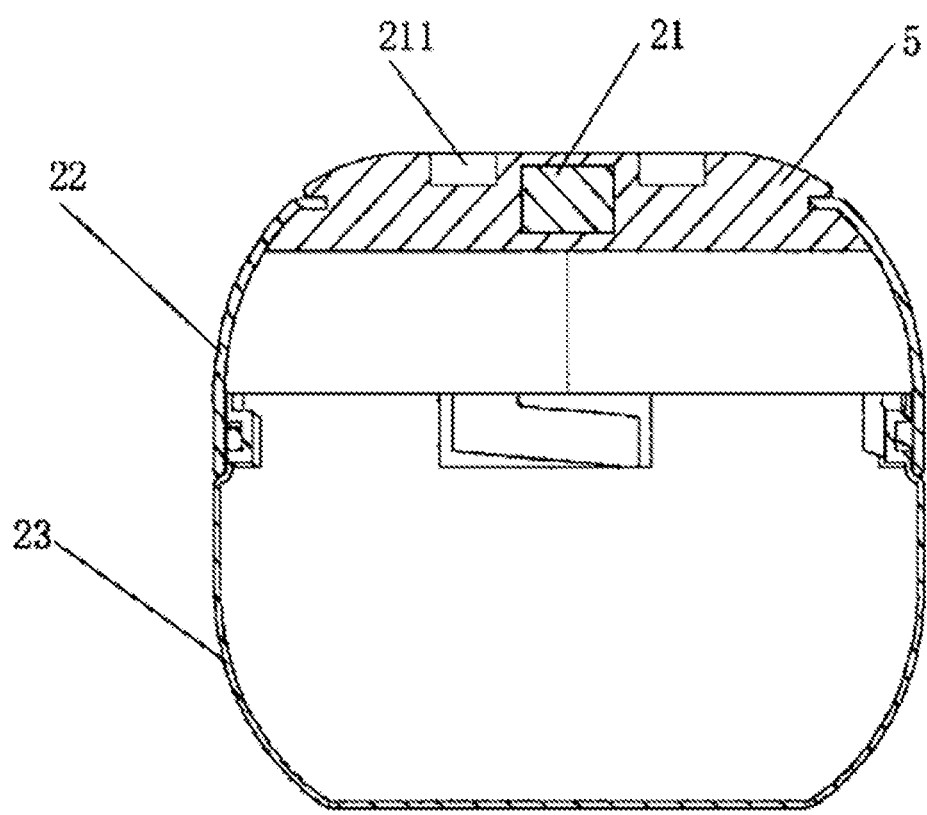
FIG. 33 is an axial section view of FIG. 31.
Figure 34:
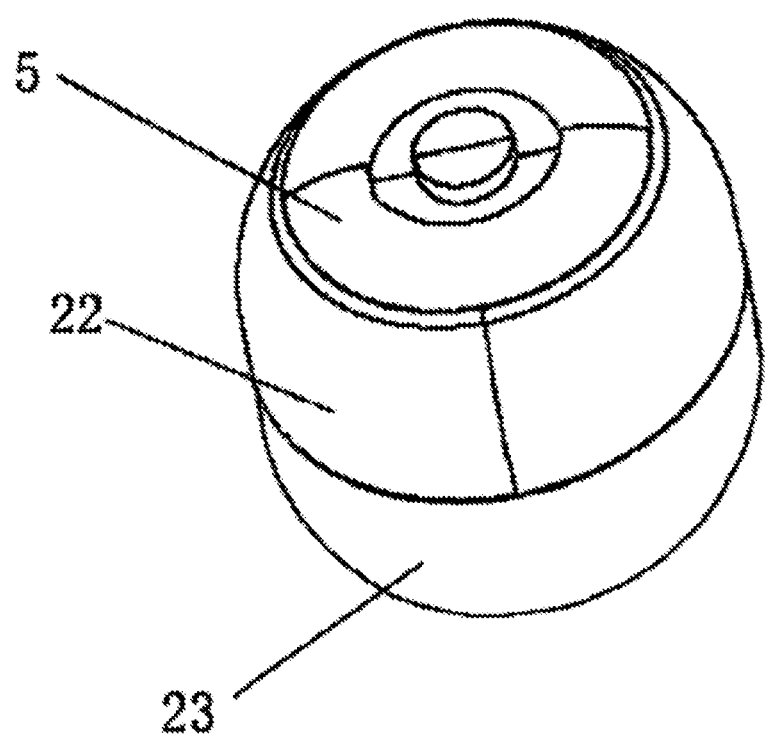
FIG. 34 is a perspective diagram showing the structure of the magnetic tea strainer in embodiment 8 of the present application.
Figure 35:
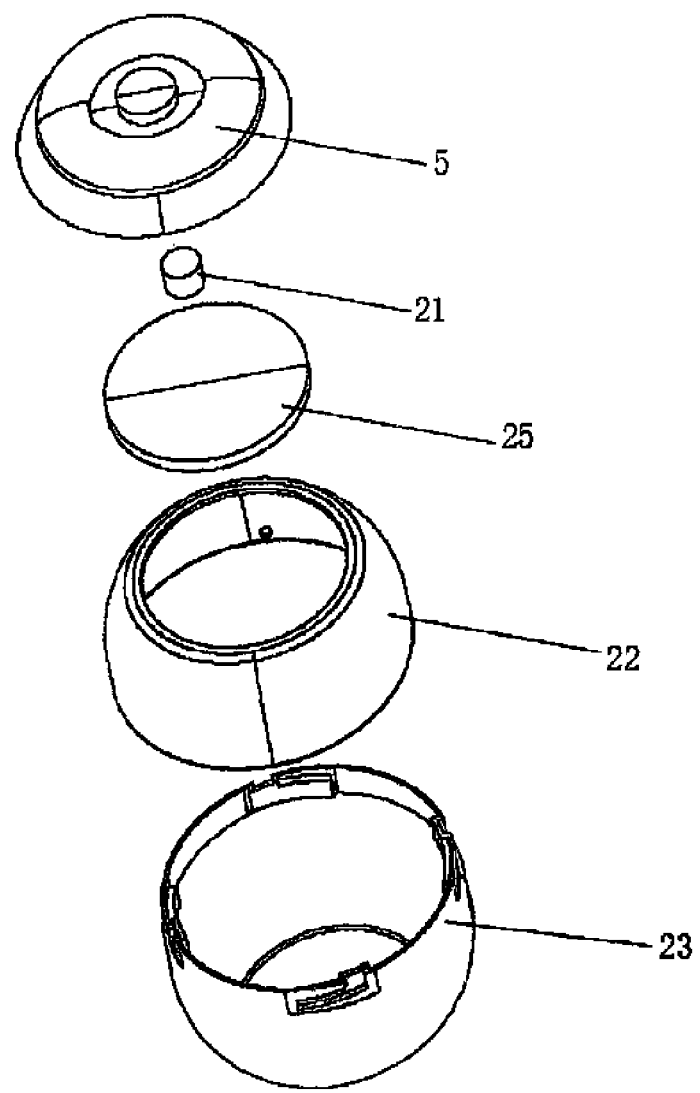
FIG. 35 is an exploded diagram showing the structure of the magnetic tea strainer in embodiment 8 of the present application.
Figure 36:
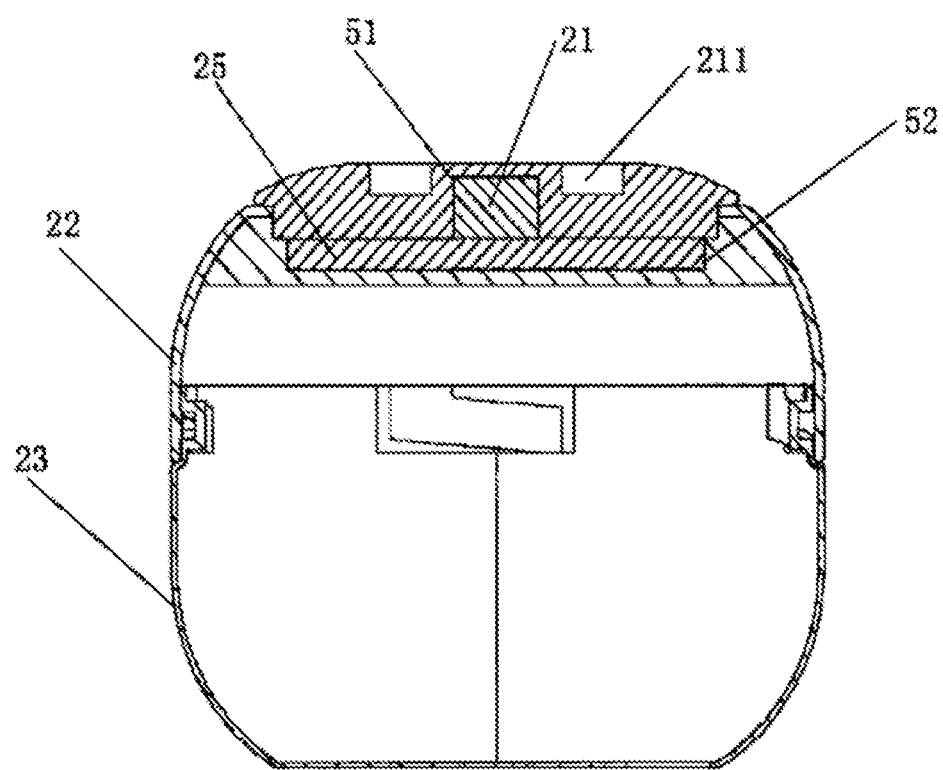
FIG. 36 is an axial section view of FIG. 34.

Referring to FIGS. 24-26, specially, in the technical solution of the present embodiment, the tea strainer 2 includes a tea strainer cap 22 and a lower strainer body 23; the tea strainer cap 22 covers the lower strainer body 23, so that a accommodating chamber 24 is formed between the tea strainer cap 22 and the lower strainer body 23. The top of the tea strainer cap 22 is configured with a sealed chamber 26 configured to accommodate the magnetically attractive metal block 21 and the counter weight of tea strainer 25, wherein the magnetically attractive metal block 21 and the counter weight of tea strainer 25 are stacked in the sealed chamber 26. It should be understood that in terms of production process, the accommodating chamber 24 will encapsulate the magnetically attractive metal block 21 and the counter weight of tea strainer 25, so that the magnetically attractive metal block 21 and the counter weight of tea strainer 25 are not exposed. In production, the seal of the magnetically attractive metal block 21 and the counter weight of tea strainer 25 can be implemented by encapsulation.

Referring to FIG. 24, specially, in the technical solution of the present embodiment, the top of the outer surface of the tea strainer cap 22 is configured with an annular positioning groove 211 configured to be snap-fitted with the lower lid 32 for positioning. The bottom of the lower lid 32 is provided with an annular positioning protrusion 321, wherein the annular positioning groove 211 is snap-fitted with the annular positioning protrusion 321. It should be understood, when the stressed block 41 is stressed, so that the relative position relative to the tea strainer 2 changes, the tea strainer 2 wouldn't move as the position of the stressed block 41 changes, thus the tea strainer 2 would separate from the cup lid 3 under gravity and would fall down to the bottom of the cup body 1 under gravity, and it is started to blew.

Specially, in the technical solution of the present embodiment, the tea strainer cap 22 and the lower strainer body 23 are in snap-fitting connection by the rotary snap 27. It should be understood that the rotary snap 27 is provided for facilitating the fast disassembling and the assembling of the tea strainer cap 22 and the lower strainer body 23, which is convenient for the user to fill the tea leaves in or pour the tea leaves out of the tea strainer 2.

Specially, in the technical solution of the present embodiment, both the tea strainer cap 22 and the lower strainer body 23 are configured with meshes 28 for sufficient contact between water and tea leaves when brewing tea.

Specially, in the technical solution of the present embodiment, the cup lid 3 is screwed to the cup body 1. The bottom of the cup lid 3 is provided with a sealing ring 34 for the sealing connection between the cup lid 3 and the cup body 1. It should be illustrated that the sealing ring 34 is provided at the connection between the cup lid 3 and the cup body 1, to ensure the sealing effect of the whole product. When the cup body 1 is turned over, the tea water will not leak out, which contributes to the use convenience and safety.

Specially, in the technical solution of the present embodiment, the magnetically attractive metal block 21 is an iron block, while the separation magnet 42 is a strong magnet. It should be illustrated that, the magnetically attractive metal block 21 can also be made of any metal with magnetically attractive ability such as drill, shackle and their alloys, which is not limited to an iron block. The separation magnet 42 is a strong magnet, which ensures the magnetic attraction strength, such that the attraction force to the magnetically attractive metal block 21 from the separation magnet 42 is greater than the gravity of the tea strainer 2 in certain distance range.

Specially, in the technical solution of the present embodiment, the cup body 1 is sleeved with a cup sleeve 11.

Specially, in the technical solution of the present embodiment, the upper end surface of the upper lid 31 is assembled with a decorative ring 312.

Embodiment 2

In the embodiment 2, the structures of the stressed block 41 and the cup lid 3 are improved, which is different from the above embodiment as follows.

Figure 17:
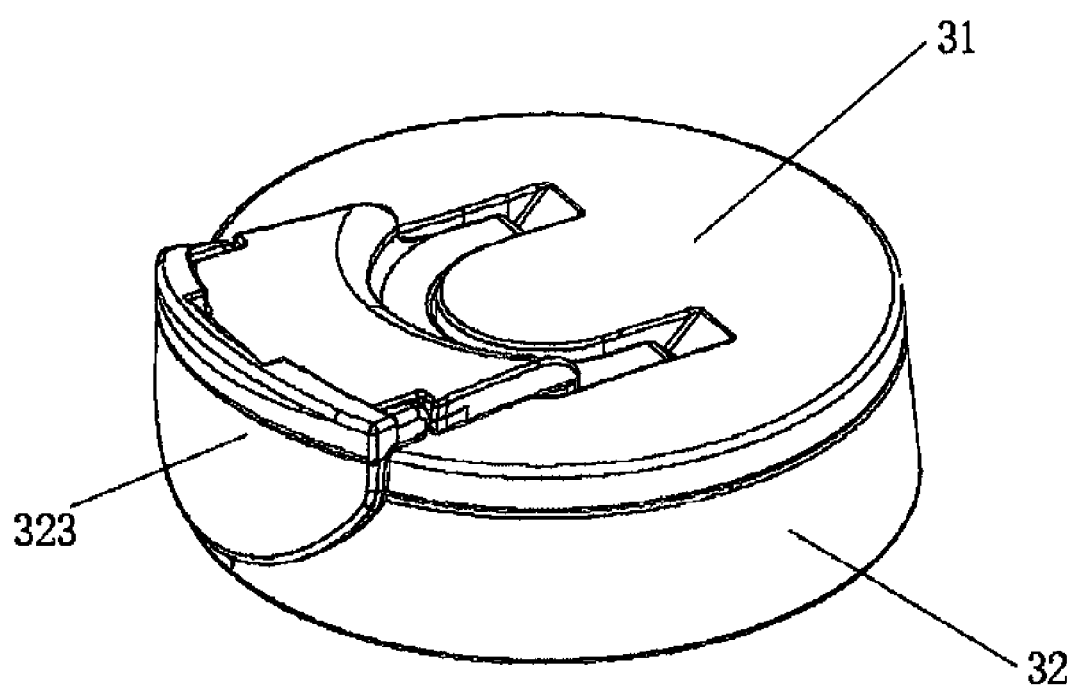
FIG. 17 is a diagram showing the assembled cup lid and flap cover in an embodiment of the present application.
Figure 18:
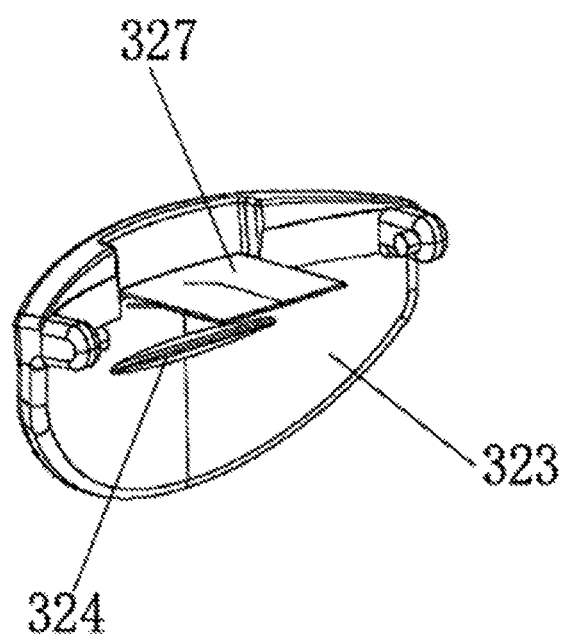
FIG. 18 is a diagram showing the structure of the flap cover in an embodiment of the present application.
Figure 19:
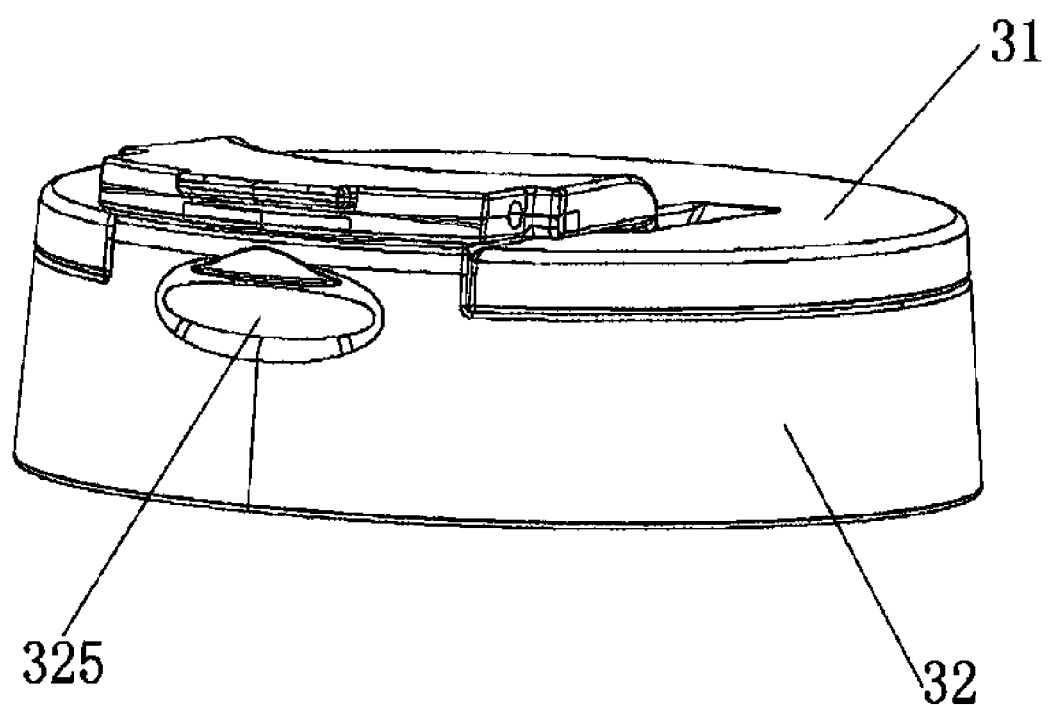
FIG. 19 is a diagram showing the structure of the cup lid in an embodiment of the present application.

Referring to FIGS. 9-16 and FIG. 27, particularly in the technical solution of the present embodiment, the stressed block 41 has a rotary structure, and the stressed block 41 includes a rotary knob shell 413 and a counter weight 412, wherein the separation magnet 42 and the counter weight 412 are respectively arranged at the upper end and the lower end of the rotary knob shell 413. The first end of the rotary knob shell 413 with the separation magnet 42 is lighter than the second end of the rotary knob shell 413 with the counter weight 412, so that the center of gravity of the rotary knob shell 413 is biased to the second end of the rotary knob shell 413 with the counter weight 412. When the rotary knob shell 413 is only subjected to its gravity, it will remain in a state that its first end with the separation magnet 42 is above and its second end with the counter weight 412 is below. By applying an external force to the rotary knob shell 413, the rotary knob shell 413 can rotate, so as to change the relative position of the separation magnet 42 to the bottom of the cup lid. When the external force disappears, the rotary knob shell 413 returns to the state that the first end with the separation magnet 42 is above, while the second end with the counter weight 412 is below. The first end of the rotary knob shell 413 with the separation magnet 42 will be above when the rotary knob shell 413 is only subjected to its gravity, which means that the sign representing "brewing" is above, too, to show that the tea strainer 2 is in the brewing state, in case that the first end of the rotary knob shell 413 with the separation magnet 42 is marked with a sign representing "brewing", while the second end of the rotary knob shell 413 with the counter weight 412 is marked with a sign representing "attracted". A cavity 35 configured to accommodate the rotary knob shell 413 is formed between the mated upper lid 31 and lower lid 32, the rotary knob shell is rotatably mounted in the cavity 35. Referring to FIGS. 17-19, a circular opening 313 or rectangular opening 314 extends from the center of the upper lid, the upper end of the rotary knob shell 413 protrudes from the circular opening 313 or the rectangular opening 314. It should be illustrated, when a force is applied to the rotary knob shell 413 (namely, when the rotary knob shell 413 is manually flicked), the rotary knob shell 413 rotates under force, so that the separation magnet 42 inside the rotary knob shell 413 moves away from the magnetically attractive metal block 21 separated by the bottom of the cup lid 3. The attraction force to the magnetically attractive metal block 21 from the separation magnet 42 is gradually decreased, and when the attraction force is less than the gravity of the tea strainer 2, the tea strainer 2 leaves the cup lid 3 to fall down in the cup body 1, and it is started to brew tea. Hereby when the external force applied to the rotary knob shell 413 disappears, the rotary knob shell 413 returns to the state that the first end with the separation magnet 42 is above and the second end with the counter weight 412 is below due to gravity. At this time, in the case that the first end of the rotary knob shell 413 with the separation magnet 42 is marked with the sign representing "brewing", the sign will also be above, which means that the tea strainer 2 is in the brewing state. When it is necessary to stop brewing tea, the cup body 1 is inverted, meanwhile, the cup lid 3 is also in an inverted state, and the rotary knob shell 413 rotates in the cavity 35 under gravity. The first end of the rotary knob shell 413 with the separation magnet 42 is lighter than the second end of the rotary knob shell 413 with the counter weight 412, so that the center of gravity of the rotary knob shell 413 is biased to the second end with the counter weight 412. In the case that the rotary knob shell 413 is only subjected to its gravity, the rotary knob shell 413 remains in the state that the first end with the separation magnet 42 is above and the second end with the counter weight 412 is below. At this time, the separation magnet 42 remains on the top, to wait to attract the magnetically attractive metal block 21 in the tea strainer 2 when the tea strainer falls down to the bottom of the cup lid 3. After the tea strainer 2 is close to the bottom of the cup lid 3 and is attracted by the separation magnet 42 and the cup body 1 returns to the upright position, the tea strainer 2 is still be attracted, such that the tea strainer 2 is separated from the tea water. In this circumstance, the first end of the rotary knob shell 413 with the separation magnet 42 remains at the bottom because of the attraction of the magnetically attractive metal block 21, and the second end of the rotary knob shell 413 with the counter weight is above. At this time, in the case that the second end of the rotary knob shell 413 with the counter weight 412 is marked with the sign representing "attracted", the sign will be above, which means that the tea strainer 2 is in the attracted state and is separated from the tea water.

Embodiment 3

The structure of the rotary knob shell 413 in embodiment 3 is improved based on embodiment 2. The difference therebetween is as follows.

Figure 21:
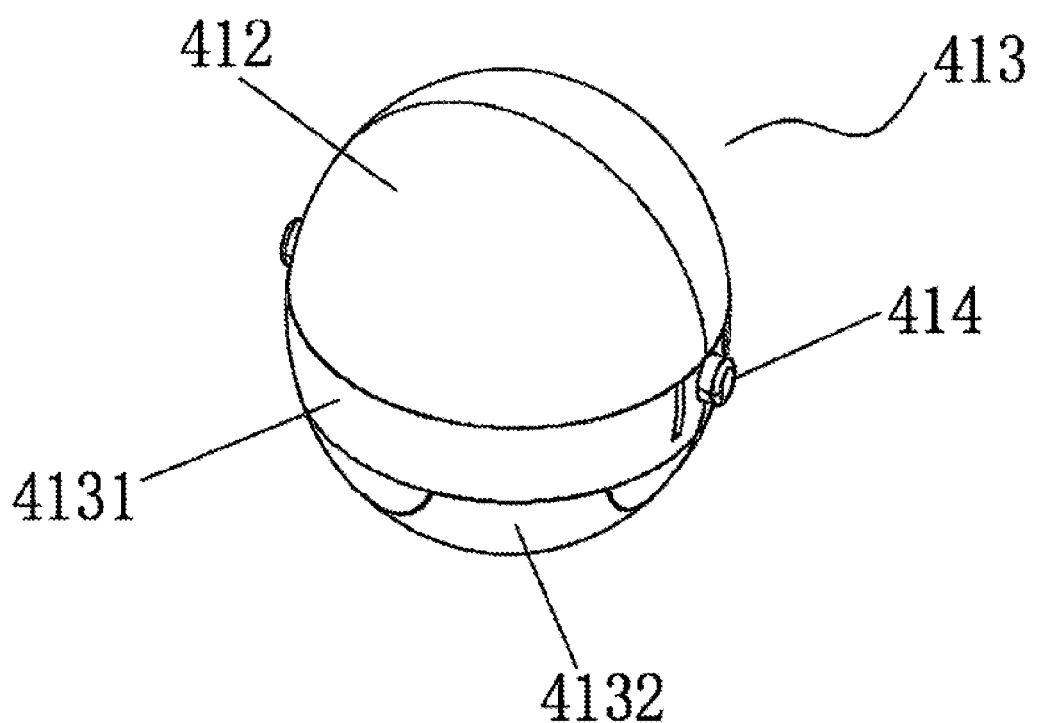
FIG. 21 is a diagram showing the structure of the rotary knob shell in an embodiment of the present application.
Figure 22:
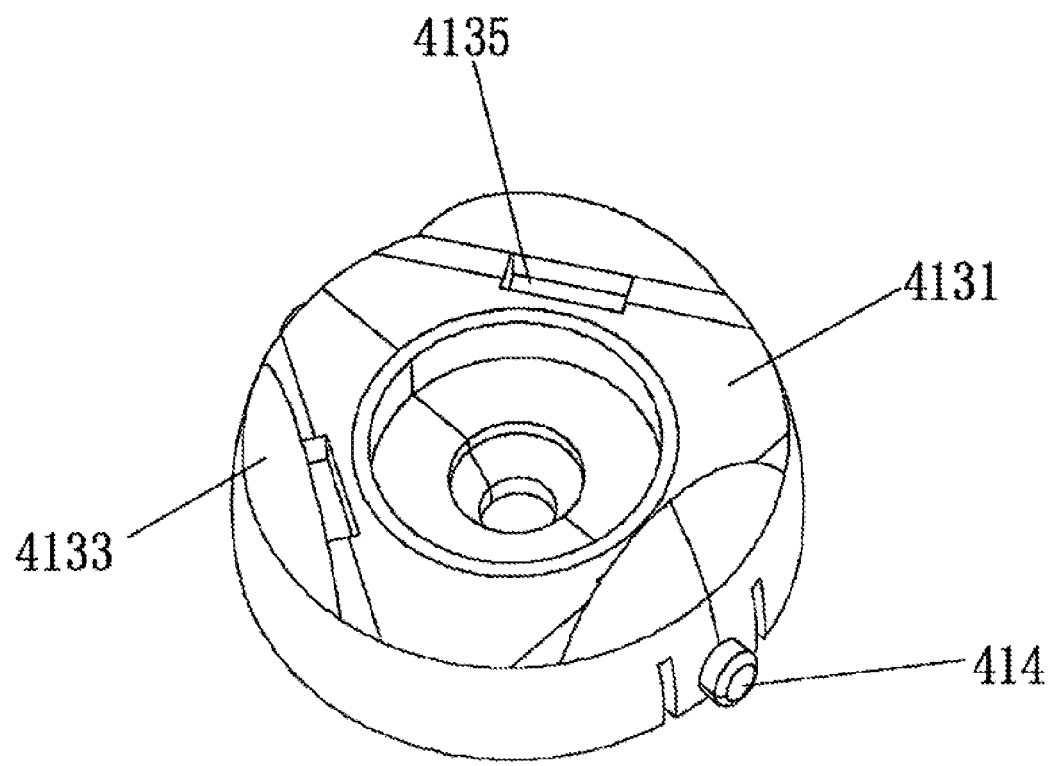
FIG. 22 is a diagram showing the structure of the upper rotary knob shell in an embodiment of the present application.

Referring to FIG. 21, particularly in the technical solution of the present embodiment, the sidewall of the rotary knob shell 413 is symmetrically provided with a rotary shaft for rotary knob 414, wherein the rotary knob shell 413 is rotatably mounted in the cavity 35 through the rotary shaft for rotary knob 414.

Embodiment 4

The structure of the rotary knob shell 413 in embodiment 4 is improved based on embodiment 3. The difference therebetween is as follows.

Figure 23:
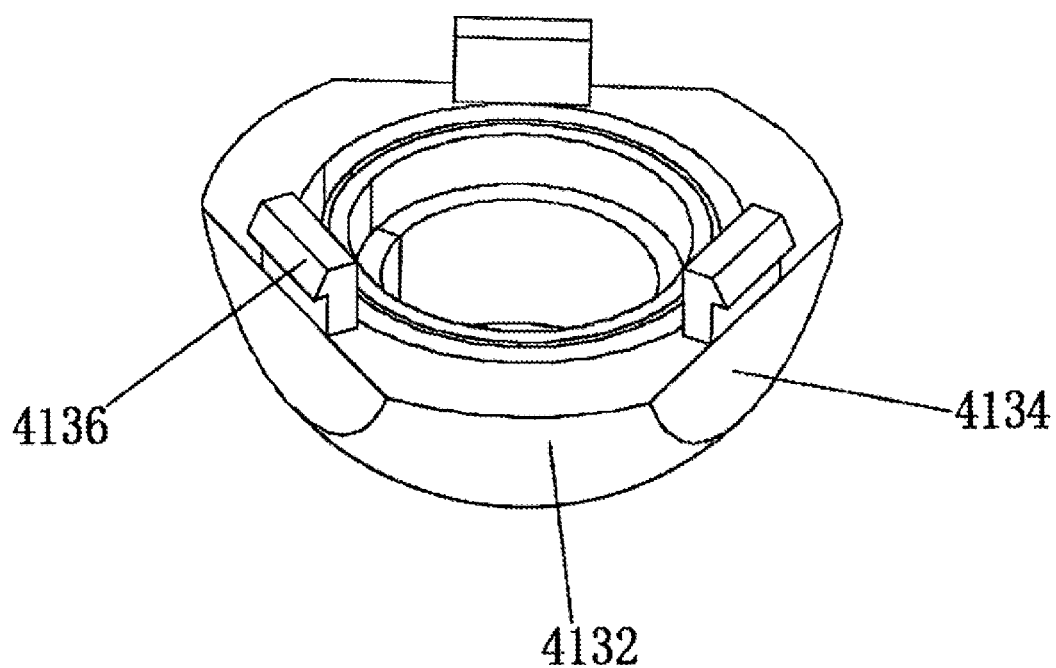
FIG. 23 is a diagram showing the structure of the lower rotary knob shell in an embodiment of the present application.

Referring to FIG. 21 and FIG. 23, in particular in the technical solution of the present embodiment, the rotary knob shell 413 is a sphere. The rotary knob shell 413 includes an upper rotary knob shell 4131 and a lower rotary knob shell 4132, wherein the lower rotary knob shell 4132 is scarfed in and snap-fitted with the upper rotary knob shell 4131. The counter weight 412 is mounted on the top of the upper rotary knob shell 4131, while the separation magnet 42 is mounted inside the lower rotary knob shell 4132, and the counter weight 412 is heavier than the separation magnet 42.

Specially in the technical solution of the present embodiment, the circumference of the upper rotary knob shell 4131 is equidistantly provided with three arc-shaped connection parts 4133, the upper rotary knob shell 4131 is equidistantly provided with three snap parts 4135, the circumference of the lower rotary knob shell 4132 is equidistantly provided with three cuts 4134, the lower rotary knob shell 4132 is equidistantly provided with three buckles 4136. After assembling the arc-shaped connection parts 4133 and the cuts 4134, respectively, the upper rotary knob shell 4131 and the lower rotary knob shell 4132 form a complete hemisphere, and the buckles 4136 are respectively in snap-connection with the snap parts 4135.

In particular in the technical solution of the present embodiment, the outer sidewall of the second end of the rotary knob shell 413 with the counter weight 412 is provided with the sigh representing "attracted", while the outer sidewall of the first end of the rotary knob shell 413 with the separation magnet 42 is provided with the sign representing "separated". It should be illustrated, it is convenient for the user to identify whether the tea strainer 2 and the cup lid 3 are in the attracted or separated state with the help of the sigh representing "attracted" and the sign representing "separated". When an opaque cup body 1 is adopted, the usage performance of the product is hereby improved.

Embodiment 5

The structure of the lower lid 32 in embodiment 5 is improved. The difference between this embodiment and the above embodiment is as follows.

Figure 20:
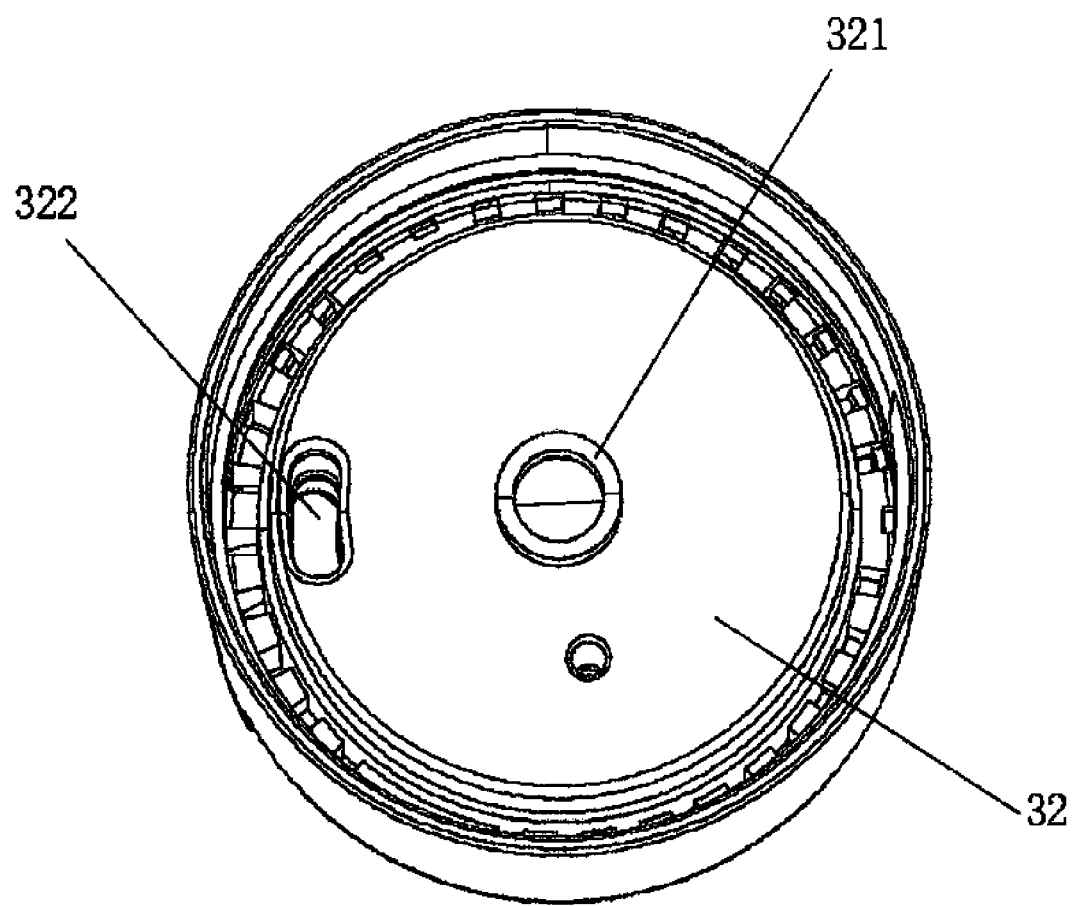
FIG. 20 is a diagram showing the structure of the upward lower lid in an embodiment of the present application.

Referring to FIGS. 18-20, in particular in the technical solution of the present embodiment, the lower lid 32 is configured with a water outlet 322, and the upper lid 31 is assembled with a flap cover 323 that can be opened upwards. The inner wall of the flap cover 323 is provided with a snap protrusion for flap cover 324, and the sidewall of the lower lid 32 is provided with a snap part for flap cover 325. The flap cover 323 covers the lower lid 32 by the snap-connection between the snap part for flap cover 325 and the snap protrusion for flap cover 324. The bottom of the flap cover 323 is provided with a sealing plug 326 configured to seal the water outlet 322. It should be illustrated that, it is convenient for the user to drink tea or water by providing the water outlet 322, such that it is not necessary to unscrew the cup lid 3 for drinking, which improves the usage performance of the product. Further, by providing the flap cover 323 and the sealing plug 326 for convenience to seal the water outlet 322, it can be ensured that the tea water will not leak out from the water outlet 322, which contributes to use convenience and reliability. When drinking tea, the flap cover 323 can be opened upwards; and when there is no need to drink tea, the flap cover 323 can be moved downward for capping, which is convenient, practical and hygienic.

In particular in the technical solution of the present embodiment, an elastic strip of flap cover 327 is provided inside the flap cover 323. It should be illustrated that, the elastic strip of flap cover 327 is configured for convenience to open the flap cover 323 upwards, the usage performance of the product is further improved.

Embodiment 6

Referring to FIGS. 28-46, the present embodiment is different from embodiment 1 as follows. In the present embodiment, the tea strainer 2 includes a tea strainer cap 22 and a lower strainer body 23 that is hollow and is open upward. The tea strainer cap 22 covers the lower strainer body 23. After the tea strainer cap 22 covers the lower strainer body 23, an accommodating chamber 24 configured to accommodate tea leaves is formed between the tea strainer cap 22 and the lower strainer body 23. The top of the tea strainer cap 22 is integrally formed with a magnetic attraction device 5; the inside of the magnetic attraction device 5 is provided with a magnetically attractive metal block 21. After the tea strainer cap 22 covers the lower strainer body 23, the center of gravity of the tea strainer 2 is biased to the side with the tea strainer cap 22.

The tea strainer 2 is attracted to and separated from the cup lid 3 with the help of the magnetic attraction device 5, thereby achieving adjustment of the tea water concentration.

When the tea strainer 2 is separated from the cup lid 3 and falls down, the tea strainer 2 turns rapidly up and down because its center of gravity is biased to the side with the tea strainer cap 22, such that the tea strainer cap 22 with the magnetically attractive metal block 21 is below, while the lower strainer body 23 is above. During falling down, the side with the tea strainer cap 22 remains facing downward till the tea strainer 2 falls down to the bottom of the cup, which contributes to a full brewing of tea leaves in the tea strainer 2. When the brewing is finished and the cup body 1 is inverted to separate the tea from the water, the tea strainer 2 turns rapidly up and down because its center of gravity is biased to the side with the tea strainer cap 22, such that the tea strainer cap 22 with the magnetically attractive metal block 21 is below, while the lower strainer body 23 is above. Also, the side with the tea strainer cap 22 remains facing downward during falling down till the tea strainer 2 falls down to the cup lid 3 and is attracted to it, which contributes to the attraction between the tea strainer and the cup lid 3, thereby completing the separation action between the tea and the water.

The tea strainer cap 22 is heavier than the lower strainer body 23. It should be illustrated, when the cup body 1 is inverted so as to make the tea strainer 2 fall down freely in the water, the tea strainer cap 22 will flip and remains facing downward all along because the mass of the tea strainer cap 22 is greater that the mass of the lower strainer body 23, so as to attract the cup lid 3 more quickly and accurately.

Embodiment 7

Referring to FIGS. 31-49, the present embodiment is different from the embodiment 6 as follows. In the present embodiment, the top of the tea strainer cap 22 is detachably assembled with a magnetic attraction device 5, wherein the magnetic attraction device 5 is mounted on the tea strainer cap 22 by snap-connection or injection molding, and the magnetic attraction device 5 has an integral structure.

Embodiment 8

Referring to FIGS. 34-42, the present embodiment is different from the embodiment 7 as follows. In the present embodiment, the inside of the magnetic attraction device 5 is configured with a first accommodating chamber 51 and a second accommodating chamber 52 from top to bottom. The first accommodating chamber 51 is configured to accommodate a magnetically attractive metal block 21, and a counter weight of tea strainer 25 is accommodated in the second accommodating chamber 52. The counter weight of tea strainer 25 is additionally provided to make the center of gravity of the tea strainer 2 is biased to the side with the tea strainer cap 22.

Embodiment 9

Figure 37:
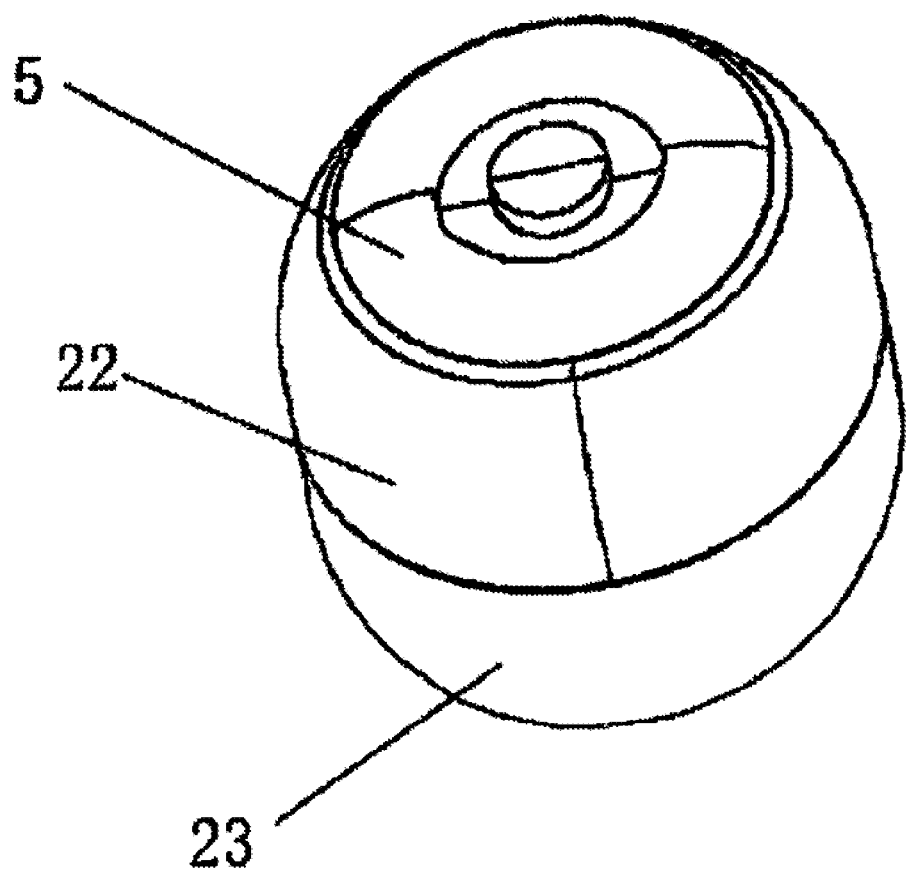
FIG. 37 is a perspective diagram showing the structure of the magnetic tea strainer in embodiment 9 of the present application.
Figure 38:
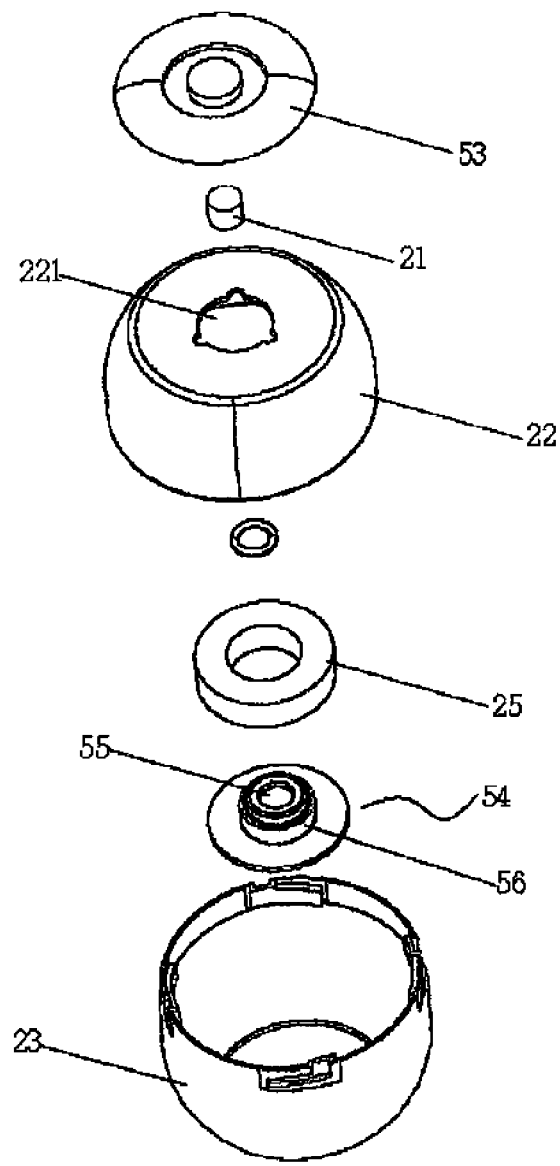
FIG. 38 is an exploded diagram showing the structure of the magnetic tea strainer in embodiment 9 of the present application.
Figure 39:
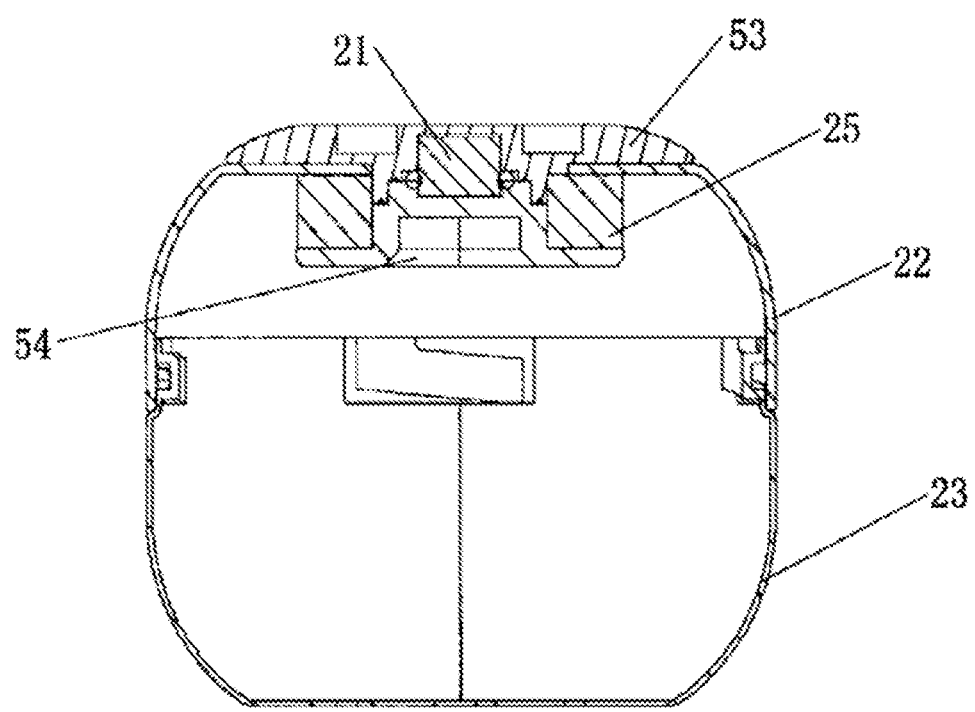
FIG. 39 is an axial section view of FIG. 37.

Referring to FIGS. 37-39, the present embodiment is different from the embodiment 8 as follows. In the present embodiment, the magnetic attraction device 5 mainly includes an upper magnetic snap 53 and a lower magnetic snap 54. The top of the tea strainer cap 22 is configured with an assembling through hole 221 configured for the upper magnetic snap 53 to pass through, the upper magnetic snap 53 passes through the assembling through hole 221, to be in snap connection with the lower magnetic snap 54 for fixing on the top of the tea strainer cap 22. A magnet mounting part 55 configured to accommodate the magnetically attractive metal block 21 is formed between the upper magnetic snap 53 and the lower magnetic snap 54. The outer sidewall of the magnet mounting part 55 is configured with a circular counter weight mounting part 56, and the counter weight of tea strainer 25 is correspondingly circular. When assembling, the magnetically attractive metal block 21 is firstly placed in the magnet mounting part 55, then the counter weight of tea strainer 25 is placed in the counter weight mounting part 56. The upper magnetic snap 53 is connected to the lower magnetic snap 54 by ultrasonic connection, so as to form the magnetic attraction device 5 as a whole.

Embodiment 10

Figure 40:
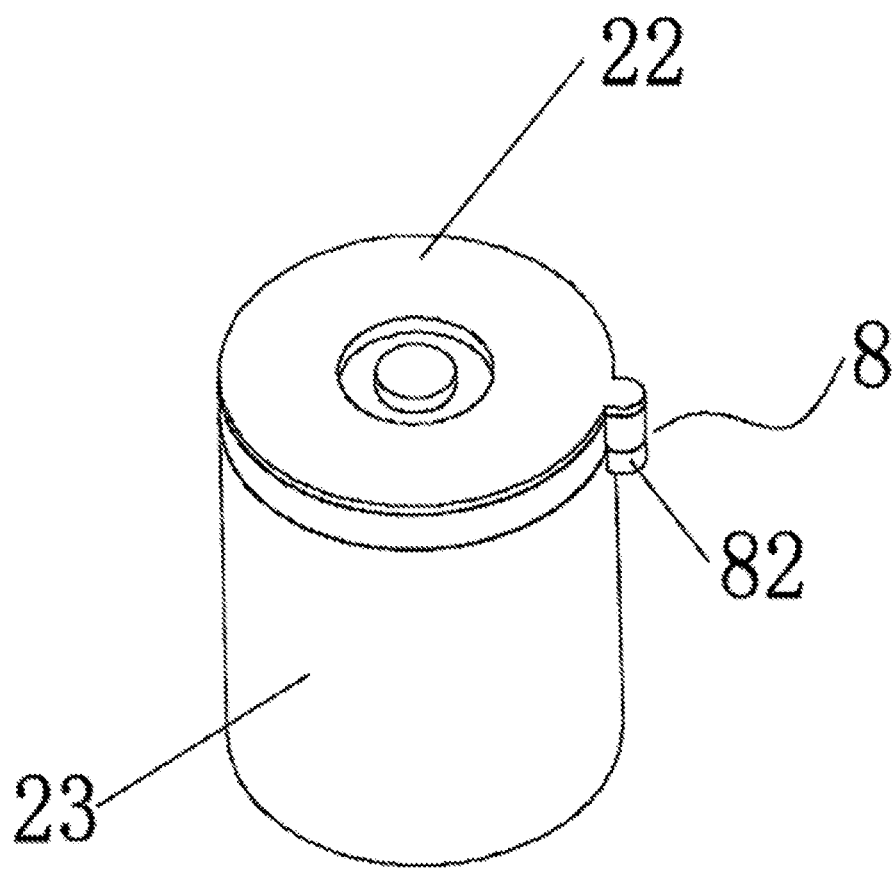
FIG. 40 is a perspective diagram showing the structure of the magnetic tea strainer in embodiment 10 of the present application.
Figure 41:
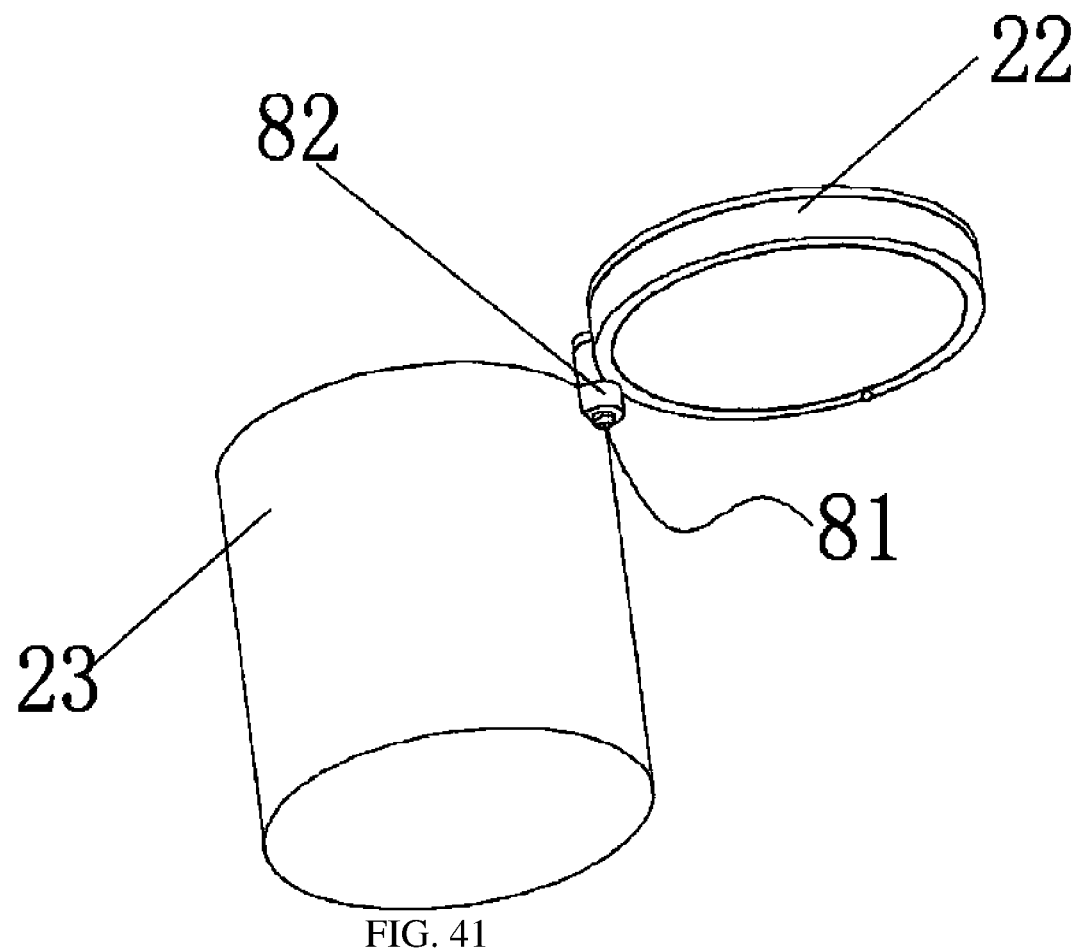
FIG. 41 is a diagram showing the tea strainer cap in the magnetic tea strainer in embodiment 10 of the present application that open outward.
Figure 42:
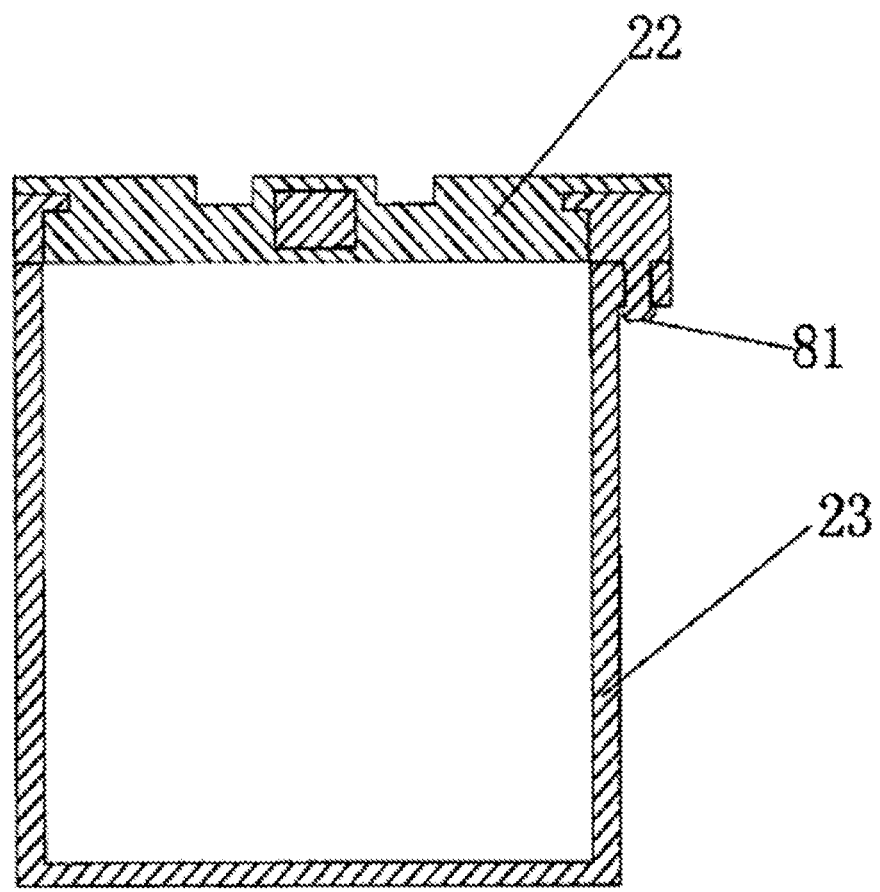
FIG. 42 is an axial section view of FIG. 40.

Referring to FIGS. 40-42, the present embodiment is different from embodiment 6 as follows. In the present embodiment, the tea strainer cap 22 covers the lower strainer body 23 through a rotary assembly 8, the rotary assembly 8 includes a rotary shaft 81 and a rotary shaft mounting part 82. The rotary shaft 81 is rotatably mounted in the rotary shaft mounting part 82, the rotary shaft 81 is arranged at the edge of the bottom of the tea strainer 2 along the axial direction of the lower strainer body 23. The rotary shaft mounting part 82 is positioned on the outer wall of the lower strainer body 23 along the axial direction of the lower strainer body 23 in a protruding manner The tea strainer cap 22 can rotate inward to cover the lower strainer body 23 by interworking of the rotary shaft 81 and the rotary shaft mounting part 82 with each other.

Usage

When brewing tea, the tea strainer cap 22 of the tea strainer 2 is opened for putting tea leaves in the accommodating chamber 24, then the tea strainer cap 22 is closed, and the tea strainer 2 is placed in the cup body 1. Then hot water is poured into the cup body 1, the cup lid 3 is tightened, and it is started to brew tea. Under gravity, the second end of the stressed block 41 with the counter weight 412 is below and the first end of the stressed block 41 with the separation magnet 42 is above. If the first end of the stressed block 41 with the separation magnet 42 is marked with the sign representing "brewing", the sign representing "brewing" is also above, which shows that the tea strainer 2 is in the brewing state at this moment.

When the concentration of tea water meets the taste requirement and it is not necessary to brew the tea leaves, the cup body 1 is turned over and in turn the cup lid 3 is also in an inverted state at this time. In the cup lid 3, the first end of the stressed block 41 with the separation magnet 42 is lighter than the second end of the stressed block 41 with the counter weight, so that the center of gravity of whole stressed block 42 as a whole is biased to its second end with the counter weight 412. Under the gravity of the stressed block itself, the second end of the stressed block 41 with the counter weight 412 is below, and the first end of the stressed block 41 with the separation magnet 42 is above. At this time, the separation magnetic 42 remains on the top and waits to attract the magnetically attractive metal block 21 in the tea strainer 2 when the tea strainer 2 falls down to the bottom of the cup lid 3. The tea strainer 2 is close to the cup lid 3 under gravity, the tea strainer 2 is attracted to the bottom of the cup lid 3 through the attraction between the separation magnet 42 an the magnetically attractive metal block 21 with each other. After the cup body 1 returns back to the upright position, the separation of the tea leaves in the tea strainer 2 and the water in the cup is implemented, brewing tea is stopped. In this circumstance, the first end of the stressed block 41 with the separation magnet 42 remains on the bottom as it is attracted by the magnetically attractive metal block 21, and the second end with the counter weight 412 is above. At this time, in the case that the second end with the counter weight 412 is marked with the sign representing "attracted", the sign will also on the top, which shows that the tea strainer 2 is in the attracted and separated state at this time.

When it is necessary to brew tea again, the separation magnet 42 rises due to the counter weight 412, or the push button is radially pushed to slide the stressed block 41, or the stressed block 41 is rolled to rotate the stressed block 41. As the relative position of the stressed block 41 is changed, so that the separation magnet 42 moves away from the magnetically attractive metal block 21, or the stressed block 41 is rolled, such that the magnetic poles of the separation magnet 42 turn over relative to the magnetically attractive metal block 21, the attraction force to the magnetically attractive metal block 21 from the separation magnet 42 is decreased, when it is less that the gravity of the tea strainer 2, the tea strainer 2 falls down to the bottom of the cup body 1 under gravity, brewing tea is continued. At this time, the stressed block 41 provided with a sliding frame 416 is reset to the attracted position (initial working position) of the separation magnet 42 and the magnetically attractive metal block 21 because of the extension of the separation spring 419. When it is not necessary to brew tea, the separation magnet 42 attracts the magnetically attractive metal block 21 to attract to the bottom of the cup lid 3. Therefore, adjustment of the tea water concentration is achieved.

List of Reference Signs 1 cup body
2 tea strainer
3 cup lid
4 separation mechanism for tea strainer
5 magnetic attraction device
312 decorative ring
313 circular opening
314 rectangular opening
321 annular positioning protrusion
8 rotary assembly
11 cup sleeve
21 magnetically attractive metal block
22 tea strainer cap
23 lower strainer body
24 accommodating chamber
25 counter weight of tea strainer
26 sealed chamber
27 rotary snap
28 mesh
31 upper lid
32 lower lid
33 support pillar
34 sealing ring
35 cavity
41 stressed block
42 separation magnet
51 first accommodating chamber
52 second accommodating chamber
53 upper magnetic snap
54 lower magnetic snap
322 water outlet
323 flap cover
324 snap protrusion for flap cover
325 snap part for flap cover
326 sealing plug
327 elastic strip of flap cover
411 rotary shaft
412 counter weight
413 rotary knob shell
414 rotary shaft for rotary knob
415 push button shell
416 sliding frame
417 chute
418 separation groove
419 separation spring
4110 rotary shaft for push button
4131 upper rotary knob shell
4132 lower rotary knob shell
4133 arc-shaped connection part
4134 cut
4135 snap part
55 magnet mounting part
56 counter weight mounting part
81 rotary shaft
82 rotary shaft mounting part
83 rotary shaft connection part
211 annular positioning groove
221 assembling through hole
311 through hole
4136 buckle
4151 upper push button shell
4152 middle push button shell
4153 lower push button shell
4161 push button
4162 cylindrical accommodating space
4163 transparent window

What is claimed is:

1. A magnetic tea-brewing device, comprising:
a cup body, a tea strainer, and a cup lid connected to the cup body, wherein the tea strainer is placed inside the cup body when in use,
the cup lid is provided with a separation mechanism for the tea strainer, the separation mechanism for the tea strainer comprises a stressed block and a separation magnet, the separation magnet is mounted on the stressed block, the stressed block under stress changes a relative position between the separation magnet and the cup lid,
the tea strainer is provided with a magnetically attractive metal block, the magnetically attractive metal block of the tea strainer is configured to be attracted by the separation magnet,
the stressed block is stressed when brewing tea, such that the separation magnet is away from the magnetically attractive metal block, the cup body is turned over when it is necessary to stop brewing the tea, such that the tea strainer is close to the cup lid under gravity, the stressed block makes the separation magnet move to the cup lid due to gravity, and the tea strainer is attracted to the cup lid because the separation magnet attracts the magnetically attractive metal block.

2. The magnetic tea-brewing device according to claim 1, wherein the stressed block has a regular geometry with uneven mass distribution,
a first end of the stressed block with the separation magnet is lighter than a second end of the stressed block without the separation magnet, such that due to the gravity, the second end of the stressed block without the separation magnet is located in a lower position relative to the first end of the stressed block with the separation magnet, and
when an external force is applied to the stressed block, the relative position between the separation magnet and the cup lid is changed.

3. The magnetic tea-brewing device according to claim 1, wherein the cup lid is provided with a support pillar, the stressed block comprises a rotary shaft and a counter weight, the rotary shaft is rotatably mounted on the support pillar, the separation magnet is mounted on a first end of the rotary shaft, the counter weight is mounted on a second end of the rotary shaft, and the counter weight is heavier than the separation magnet.

4. The magnetic tea-brewing device according to claim 1, wherein the stressed block comprises a rotary knob shell and a counter weight, the separation magnet and the counterweight are respectively arranged on an upper end and a lower end of the rotary knob shell, the counter weight is heavier than the separation magnet, so that a center of gravity of the rotary knob shell as a whole is biased to the lower end of the rotary knob shell with the counterweight,
the cup lid is configured with a cavity configured to accommodate the rotary knob shell, and the rotary knob shell is rotatably mounted in the cavity.

5. The magnetic tea-brewing device according to claim 4, wherein the rotary knob shell comprises an upper rotary knob shell and a lower rotary knob shell, an edge of the upper rotary knob shell is provided with an arc-shaped connection part, the upper rotary knob shell is provided with a snap part, an edge of the lower rotary knob shell is provided with a cut, the lower rotary knob shell is provided with a buckle, the arc-shaped connection part cooperates with the cut, and the buckle is in snap-connection with the snap part.

6. The magnetic tea-brewing device according to claim 1, wherein the cup lid comprises an upper lid and a lower lid, the lower lid is configured with a water outlet, the upper lid is assembled with a flap cover, the flap cover is provided with a snap protrusion for the flap cover, the lower lid is provided with a snap part for the flap cover, the flap cover is in snap-connection with the snap part for the flap cover by means of the snap protrusion for flap cover, and a bottom of the flap cover is provided with a sealing plug configured to seal the water outlet.

7. The magnetic tea-brewing device according to claim 6, wherein the flap cover is provided with an elastic strip of flap cover.

8. The magnetic tea-brewing device according to claim 1, wherein the tea strainer comprises a tea strainer cap and a strainer body, the tea strainer cap covers the strainer body,
an accommodating space configured to accommodate tea leaves is formed between the tea strainer ca p and the strainer body after the tea strainer cap covers the strainer body,
the tea strainer cap is provided with a magnetic attraction device, the magnetic attraction device is provided with the magnetically attractive metal block, and after the tea strainer cap covers the strainer body, a center of gravity of the tea strainer is biased to the tea strainer cap.

9. The magnetic tea-brewing device according to claim 8, wherein the tea strainer cap is heavier than the strainer body.

10. The magnetic tea-brewing device according to claim 8, wherein the magnetic attraction device is detachably mounted on a top of the tea strainer cap, and the top of the tea strainer cap is configured with an annular positioning groove configured to be snap-fitted with the cup lid.

11. The magnetic tea-brewing device according to claim 8, wherein the magnetic attraction device is configured with a first accommodating chamber and a second accommodating chamber, the first accommodating chamber is configured to accommodate the magnetically attractive metal block, and a counter weight is accommodated in the second accommodating chamber.

12. The magnetic tea-brewing device according to claim 8, wherein the magnetic attraction device comprises an upper magnetic snap and a lower magnetic snap, a top of the tea strainer cap is configured with an assembling through hole configured for the upper magnetic snap to pass through, the upper magnetic snap passes through the assembling through hole, to be in snap-connection with the lower magnetic snap for fixing on the top of the tea strainer cap.

\* \* \* \* \*